(12) United States Patent
Xiong

(10) Patent No.: US 11,561,687 B2
(45) Date of Patent: Jan. 24, 2023

(54) OPERATION METHOD FOR SPLIT-SCREEN DISPLAY AND ELECTRONIC DEVICE

(71) Applicant: Huawei Technologies Co., Ltd., Guangdong (CN)

(72) Inventor: Liudong Xiong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/594,898

(22) PCT Filed: Apr. 24, 2020

(86) PCT No.: PCT/CN2020/086654
§ 371 (c)(1),
(2) Date: Nov. 2, 2021

(87) PCT Pub. No.: WO2020/224449
PCT Pub. Date: Nov. 12, 2020

(65) Prior Publication Data
US 2022/0197486 A1  Jun. 23, 2022

(30) Foreign Application Priority Data

May 5, 2019  (CN) .......................... 201910369148.5

(51) Int. Cl.
*G06F 3/04886* (2022.01)
*G06F 3/04845* (2022.01)
(52) U.S. Cl.
CPC ...... *G06F 3/04845* (2013.01); *G06F 3/04886* (2013.01); *G06F 2203/04803* (2013.01)

(58) Field of Classification Search
CPC .. G06F 16/951; G06F 16/9577; G06F 16/958; G06F 16/972; G06F 40/14;
(Continued)

(56) References Cited

U.S. PATENT DOCUMENTS

2012/0176322 A1* 7/2012 Karmi ................. G06F 3/04883
345/173
2014/0129951 A1* 5/2014 Amin ................. G06Q 30/0635
715/738
(Continued)

FOREIGN PATENT DOCUMENTS

CN      105389111 A     3/2016
CN      106020473 A    10/2016
(Continued)

*Primary Examiner* — Rayeez R Chowdhury
(74) *Attorney, Agent, or Firm* — Womble Bond Dickinson (US) LLP

(57) ABSTRACT

The present disclosure relates to an operation method for split-screen display. During split-screen display of an electronic device, the electronic device receives a first operation performed by a user in a display area that displays a first interface of a first application, and displays a second interface of the first application in the display area in response to the first operation, where the second interface is a previous-level interface of the first interface; or the electronic device receives a second operation performed by a user in a display area, and enables, in response to the second operation, a first application displayed in the display area to exit the split-screen display; or the electronic device receives a third operation performed by a user in a display area, and displays a multi-task interface in the display area in response to the third operation.

20 Claims, 17 Drawing Sheets

(58) Field of Classification Search
CPC .... G06F 40/154; G06F 40/174; G06F 40/183;
G06F 40/186; G06F 40/221; G06F 8/20;
G06F 8/30; G06F 8/38; G06F 9/451;
G06F 2203/04803; G06F 2203/04808;
G06F 3/04883; G06F 8/60; G06F 8/61;
G06F 9/445; G06F 9/44526; G06F
16/2455; G06F 11/1438; G06F 11/1441;
G06F 16/00; G06F 21/568; G06F 21/575;
G06F 9/4406; G06F 9/4418; G06F 9/54
See application file for complete search history.

(56) References Cited

U.S. PATENT DOCUMENTS

| | | | |
|---|---|---|---|
| 2014/0157163 A1* | 6/2014 | Strutin-Belinoff | ........................... G06F 3/04883 715/781 |
| 2015/0097755 A1* | 4/2015 | Kim | ................. G06F 3/1446 345/1.3 |
| 2015/0220299 A1* | 8/2015 | Kim | ...................... G06F 1/1635 345/1.3 |
| 2016/0034597 A1 | 2/2016 | Graf et al. | |
| 2017/0154452 A1* | 6/2017 | Ishizu | ................ H04N 21/4316 |
| 2017/0364249 A1* | 12/2017 | Kumaki | .............. G06F 3/04845 |
| 2019/0042066 A1* | 2/2019 | Kim | ...................... G06F 1/1649 |
| 2019/0339855 A1* | 11/2019 | Walkin | .............. H04M 1/72403 |
| 2021/0056878 A1* | 2/2021 | Lee | ......................... G06F 3/041 |

FOREIGN PATENT DOCUMENTS

| | | |
|---|---|---|
| CN | 106168870 A | 11/2016 |
| CN | 107508990 A | 12/2017 |
| CN | 108319414 A | 7/2018 |
| CN | 108416203 A | 8/2018 |
| CN | 108804009 A | 11/2018 |
| CN | 108958629 A | 12/2018 |
| CN | 108958681 A | 12/2018 |
| CN | 109062467 A | 12/2018 |
| CN | 110244893 A | 9/2019 |

* cited by examiner

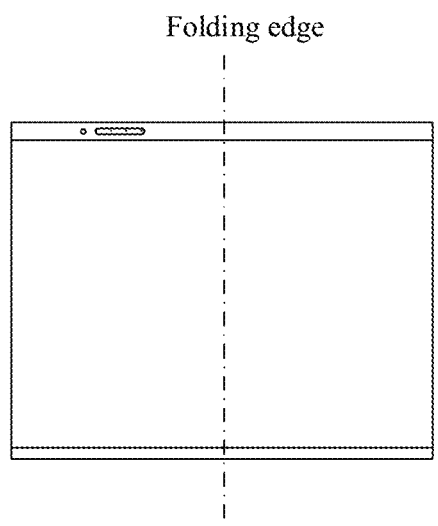
FIG. 2(a)
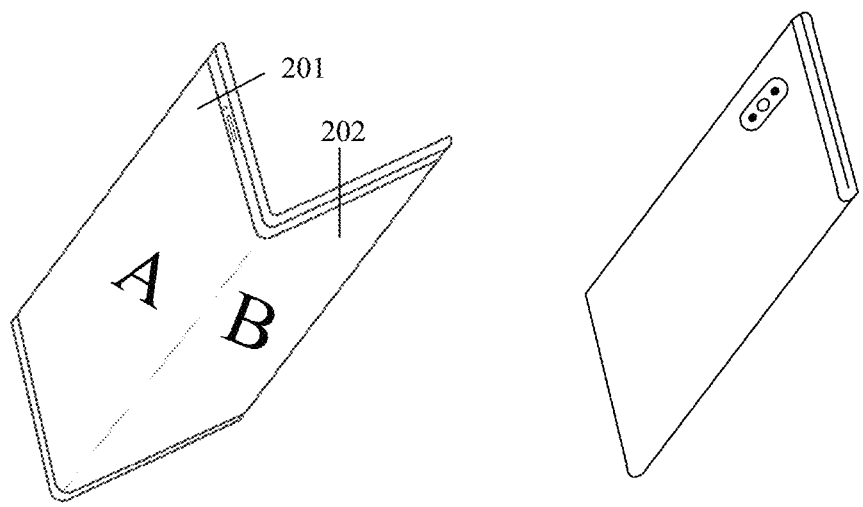
FIG. 2(b)
FIG. 2(c)

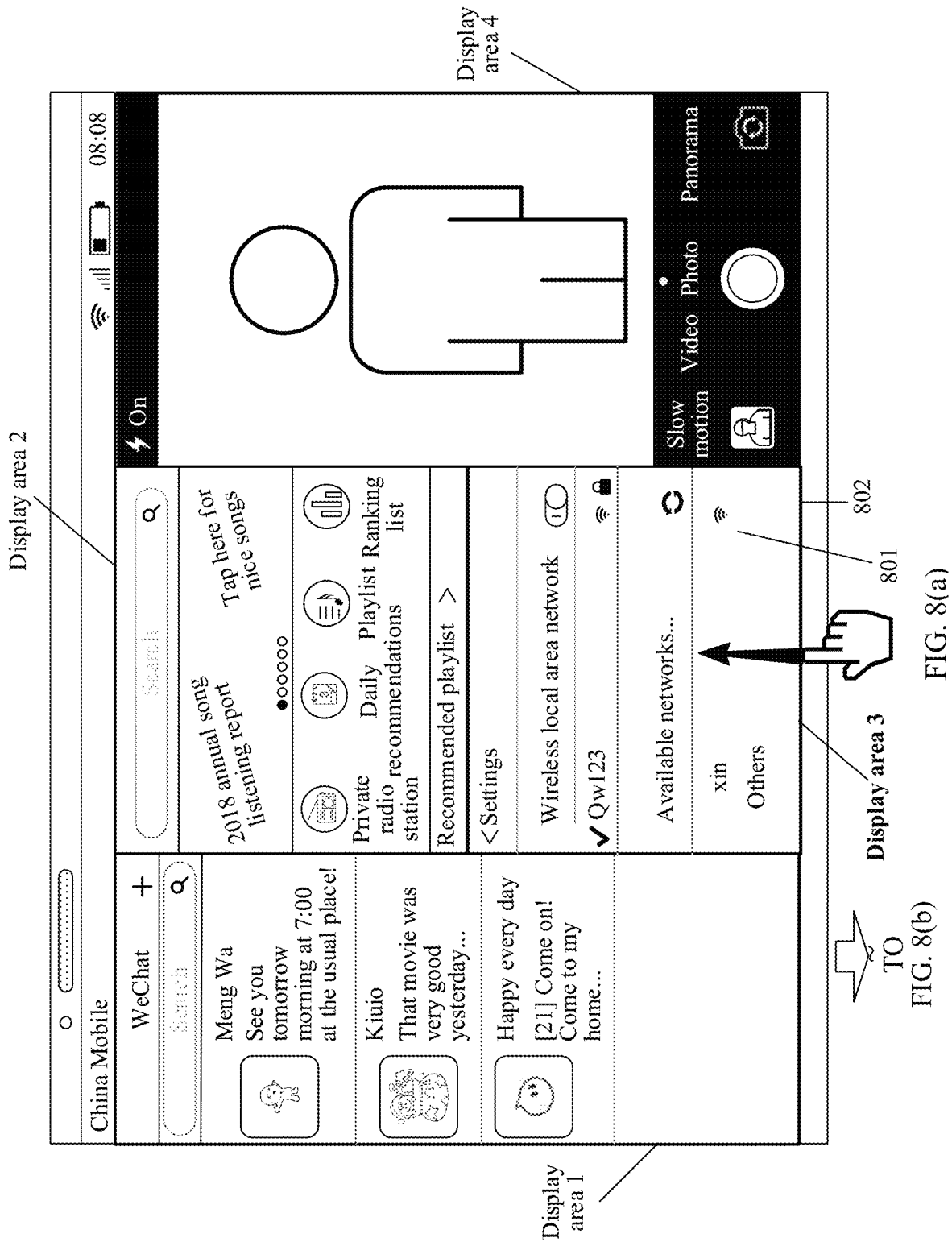

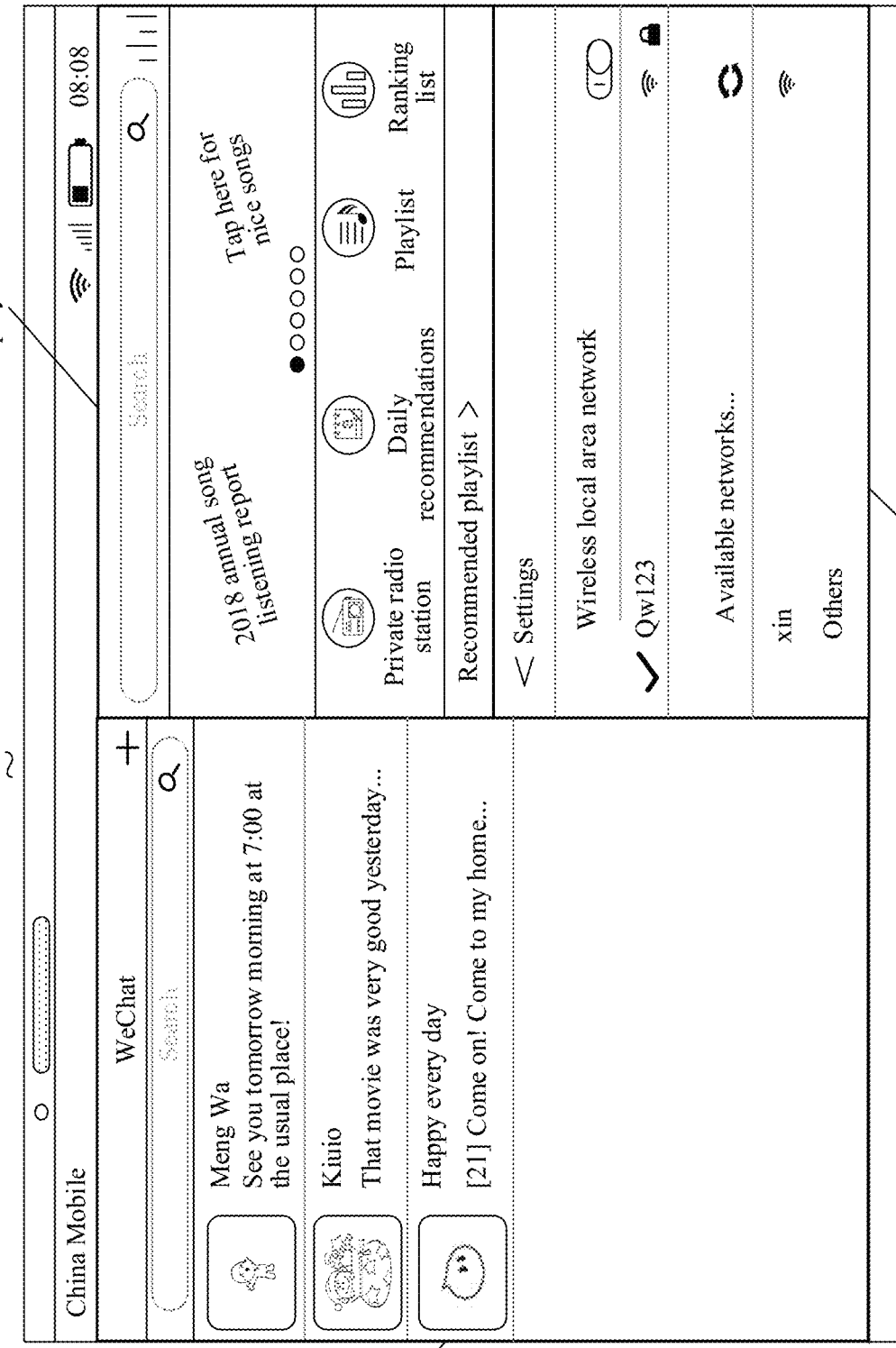

OPERATION METHOD FOR SPLIT-SCREEN DISPLAY AND ELECTRONIC DEVICE

This application is a national stage of International Application No. PCT/CN2020/086654, filed on Apr. 24, 2020, which claims priority to Chinese Patent Application No. 201910369148.5, filed on May 5, 2019. Both of the aforementioned applications are hereby incorporated by reference in their entireties.

TECHNICAL FIELD

This application relates to the field of electronic devices, and in particular, to an operation method for split-screen display and an electronic device.

BACKGROUND

Nowadays, an electronic device such as a mobile phone has become an indispensable communication tool in people's daily life and work, and currently a touchscreen electronic device such as a touchscreen mobile phone is most widely applied. With continuous development of screen technologies, a touchscreen of the touchscreen mobile phone is increasingly enlarged in size, and is enlarged from the early popular 3 inches to 4 inches, 5 inches, 6 inches, or even a larger size. To make full use of the increasingly enlarged touchscreen, split-screen display currently becomes a relatively common use scenario of the touchscreen mobile phone. After a user triggers split-screen display, the mobile phone may divide the touchscreen into a plurality of display areas, and display interfaces of different applications in the display areas. For example, as shown in FIG. 1(a), the mobile phone may divide the touchscreen into two display areas, for example, a display area 101 and a display area 102 shown in FIG. 1(a). An interface 103 of a shopping application is displayed in the display area 101, and an interface 104 of a settings application (for example, a settings interface of a wireless local area network shown in FIG. 1(a)) is displayed in the display area 102.

During split-screen display, if the user wants to perform an operation such as going back to a previous interface of an application in the plurality of display areas, the application first needs to be in an active state. For example, the user may tap a display area in which the application is located to enable the application to be in the active state, and then perform an operation such as going back to a previous interface. For example, with reference to FIG. 1(a), FIG. 1(b), and FIG. 1(c), when the user wants to go back to a previous interface of the settings application, as shown in FIG. 1(a), the user may first tap the display area 102 in which the settings application is located to enable the settings application to be in an active state. Then, as shown in FIG. 1(b), the user may perform a tap operation on a back button 105 in a navigation bar. In response to the tap operation, as shown in FIG. 1(c), the mobile phone may display a main interface 106 of the settings application in the display area 102, that is, the mobile phone executes an event of going back to a previous-level display interface of the settings application.

It may be learned that during split-screen display, the user needs to perform a series of operations to implement an operation on an application in the plurality of display areas. Consequently, use efficiency of the electronic device is reduced.

SUMMARY

Embodiments of this application provide an operation method for split-screen display and an electronic device, to resolve a problem that use efficiency of an electronic device is low because during split-screen display, a user needs to perform a series of operations to implement an operation on an application in a plurality of display areas.

To achieve the foregoing objective, the following technical solutions are used in the embodiments of this application:

According to a first aspect, an embodiment of this application provides an operation method for split-screen display. The method is applied to an electronic device that includes a touchscreen. The touchscreen is divided into at least two display areas, and interfaces of different applications are respectively displayed in the at least two display areas. The at least two display areas may include a first display area, and a first interface of a first application is displayed in the first display area. The method may include: The electronic device receives a first operation performed by a user in the first display area, and the electronic device may display a second interface of the first application in the first display area in response to the first operation, where the second interface is a previous-level interface of the first interface; or the electronic device receives a second operation performed by a user in the first display area, and the electronic device may enable, in response to the second operation, the first application displayed in the first display area to exit split-screen display; or the electronic device receives a third operation performed by a user in the first display area, and the electronic device may display a multi-task interface in the first display area in response to the third operation, where the multi-task interface may include an identifier of an application that runs in background or an application recently used by the user on the electronic device.

According to the operation method for split-screen display provided in this embodiment of this application, during split-screen display, the user does not need to perform a series of operations for interfaces of different applications displayed in a plurality of display areas, but needs to perform only one operation in a corresponding display area. In this way, the electronic device can execute events such as going back, exiting, or displaying a multi-task interface for an application displayed in the display area. This reduces complexity of a user operation, improves use efficiency of the electronic device, and implements efficient interaction between the electronic device and the user.

In an embodiment, that the electronic device displays a second interface of the first application in the first display area in response to the first operation may include: In response to the first operation, when determining that the first interface is not a home page of the first application, the electronic device may display the second interface of the first application in the first display area. When the user performs the first operation in the first display area, if the interface currently displayed in the first display area is not the home page of the first application, in response to the first operation, the electronic device may go back to the previous-level interface of the interface of the first application displayed in the first display area.

In another embodiment, the method may further include: In response to the first operation, when determining that the first interface is the home page of the first application, the electronic device enables the first application displayed in the first display area to exit split-screen display. When the user performs the first operation in the first display area, if the interface currently displayed in the first display area is the home page of the first application, in response to the first operation, the electronic device may enable the first application displayed in the first display area to exit split-screen display In another embodiment, the first operation may be a first sliding operation; and a start point of the first sliding operation is a first edge of the first display area, a sliding direction is away from the first edge, and duration is less than or equal to first preset duration; or a start point of the first sliding operation is a first edge of the first display area, a sliding direction is away from the first edge, and a sliding distance is less than or equal to a first preset distance; or a start point of the first sliding operation is a first edge of the first display area, a sliding direction is away from the first edge, and the sliding direction is a first preset direction. It may be learned that when the user performs a sliding operation in a display area, the electronic device may be triggered to execute an event of going back to a previous-level interface for an application in the display area.

In another embodiment, the second operation may be a second sliding operation; and both a start point and an end point of the second sliding operation are the first edge of the first display area, a sliding direction is first away from the first edge, and then is toward the first edge, and sliding duration in a direction away from the first edge is less than or equal to second preset duration; or both a start point and an end point of the second sliding operation are the first edge of the first display area, a sliding direction is first away from the first edge, and then is toward the first edge, and a sliding distance in a direction away from the first edge is less than or equal to a second preset distance; or a start point of the second sliding operation is the first edge of the first display area, a sliding direction is away from the first edge, and the sliding direction is a second preset direction. It may be learned that when the user performs a sliding operation in a display area, the electronic device may be triggered to execute an event of exiting split-screen display for an application in the display area.

In another embodiment, the third operation may be a third sliding operation; and a start point of the third sliding operation is the first edge of the first display area, a sliding direction is away from the first edge, and duration is greater than third preset duration; or a start point of the third sliding operation is the first edge of the first display area, a sliding direction is away from the first edge, duration is greater than third preset duration, and there is a pause of predetermined duration after sliding; or a start point of the third sliding operation is the first edge of the first display area, a sliding direction is away from the first edge, and a sliding distance is greater than a third preset distance; or a start point of the third sliding operation is the first edge of the first display area, a sliding direction is away from the first edge, and the sliding direction is a third preset direction. It may be learned that when the user performs a sliding operation in a display area, the electronic device may be triggered to execute an event of displaying a multi-task interface in the display area.

The first edge of the first display area is an edge of the first display area that is closely adjacent to an edge of the touchscreen.

According to a second aspect, an embodiment of this application provides an electronic device. The electronic device may include one or more processors, a memory, and a touchscreen. The touchscreen is configured to display content based on an indication of the one or more processors. The memory is configured to store one or more programs. The one or more processors are configured to run the one or more programs, to implement the following actions: dividing the touchscreen into at least two display areas, and indicating the touchscreen to respectively display interfaces of different applications in the at least two display areas, where the at least two display areas include a first display area, and a first interface of a first application is displayed in the first display area; and receiving a first operation performed by a user in the first display area, and indicating, in response to the first operation, the touchscreen to display a second interface of the first application in the first display area, where the second interface is a previous-level interface of the first interface; or receiving a second operation performed by a user in the first display area, and indicating, in response to the second operation, the touchscreen to enable the first application displayed in the first display area to exit split-screen display; or receiving a third operation performed by a user in the first display area, and indicating, in response to the third operation, the touchscreen to display a multi-task interface in the first display area, where the multi-task interface includes an identifier of an application that runs in background or an application recently used by the user on the electronic device.

In an embodiment, the indicating, in response to the first operation, the touchscreen to display a second interface of the first application in the first display area includes: in response to the first operation, when determining that the first interface is not a home page of the first application, indicating the touchscreen to display the second interface of the first application in the first display area.

In another embodiment, the one or more processors are configured to run the one or more programs, to further implement the following actions: in response to the first operation, when determining that the first interface is the home page of the first application, indicating the touchscreen to enable the first application displayed in the first display area to exit split-screen display.

In another embodiment, the first operation may be a first sliding operation; and a start point of the first sliding operation is a first edge of the first display area, a sliding direction is away from the first edge, and duration is less than or equal to first preset duration; or a start point of the first sliding operation is a first edge of the first display area, a sliding direction is away from the first edge, and a sliding distance is less than or equal to a first preset distance; or a start point of the first sliding operation is a first edge of the first display area, a sliding direction is away from the first edge, and the sliding direction is a first preset direction.

In another embodiment, the second operation may be a second sliding operation; and both a start point and an end point of the second sliding operation are the first edge of the first display area, a sliding direction is first away from the first edge, and then is toward the first edge, and sliding duration in a direction away from the first edge is less than or equal to second preset duration; or both a start point and an end point of the second sliding operation are the first edge of the first display area, a sliding direction is first away from the first edge, and then is toward the first edge, and a sliding distance in a direction away from the first edge is less than or equal to a second preset distance; or a start point of the second sliding operation is the first edge of the first display area, a sliding direction is away from the first edge, and the sliding direction is a second preset direction.

In another embodiment, the third operation may be a third sliding operation; and a start point of the third sliding operation is the first edge of the first display area, a sliding direction is away from the first edge, and duration is greater than third preset duration; or a start point of the third sliding operation is the first edge of the first display area, a sliding direction is away from the first edge, duration is greater than third preset duration, and there is a pause of predetermined duration after sliding; or a start point of the third sliding operation is the first edge of the first display area, a sliding direction is away from the first edge, and a sliding distance is greater than a third preset distance; or a start point of the third sliding operation is the first edge of the first display area, a sliding direction is away from the first edge, and the sliding direction is a third preset direction.

The first edge of the first display area is an edge of the first display area that is closely adjacent to an edge of the touchscreen.

According to a third aspect, an embodiment of this application provides a computer storage medium. The computer storage medium includes computer instructions, and when the computer instructions are run on an electronic device, the electronic device is enabled to perform the operation method for split-screen display according to the first aspect or any embodiment of the first aspect.

According to a fourth aspect, an embodiment of this application provides a computer program product. When the computer program product runs on a computer, the computer is enabled to perform the operation method for split-screen display according to the first aspect or any embodiment of the first aspect.

According to a fifth aspect, an embodiment of this application provides an electronic device. The electronic device may include one or more processors, a memory, and a touchscreen. The memory stores one or more computer programs. The one or more processors are configured to execute the one or more computer programs. The one or more computer programs include instructions, and the instructions may be used to perform the operation method for split-screen display according to the first aspect or any embodiment of the first aspect.

According to a sixth aspect, an embodiment of this application provides an apparatus. The apparatus has a function of implementing the actions of the electronic device in the method according to the first aspect. The function may be implemented by hardware, or may be implemented by executing corresponding software by hardware. The hardware or software includes one or more modules corresponding to the function, for example, an input unit or module and a display unit or module.

It should be understood that descriptions of technical features, technical solutions, beneficial effects, or similar statements in this application do not imply that all features and advantages can be implemented in any single embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In other embodiments, additional technical features and beneficial effects may further be identified in a specific embodiment that does not reflect all the embodiments.

BRIEF DESCRIPTION OF DRAWINGS

FIG. 2(a), FIG. 2(b), and FIG. 2(c) are schematic diagrams of a form of an electronic device with a foldable screen according to an embodiment of this application;

FIG. 8(a) and FIG. 8(b) each are still another schematic diagram of an interface during split-screen display according to an embodiment of this application;

FIG. 9(a) and FIG. 9(b) each are still another schematic diagram of an interface during split-screen display according to an embodiment of this application.

DESCRIPTION OF EMBODIMENTS

Figure 1A:
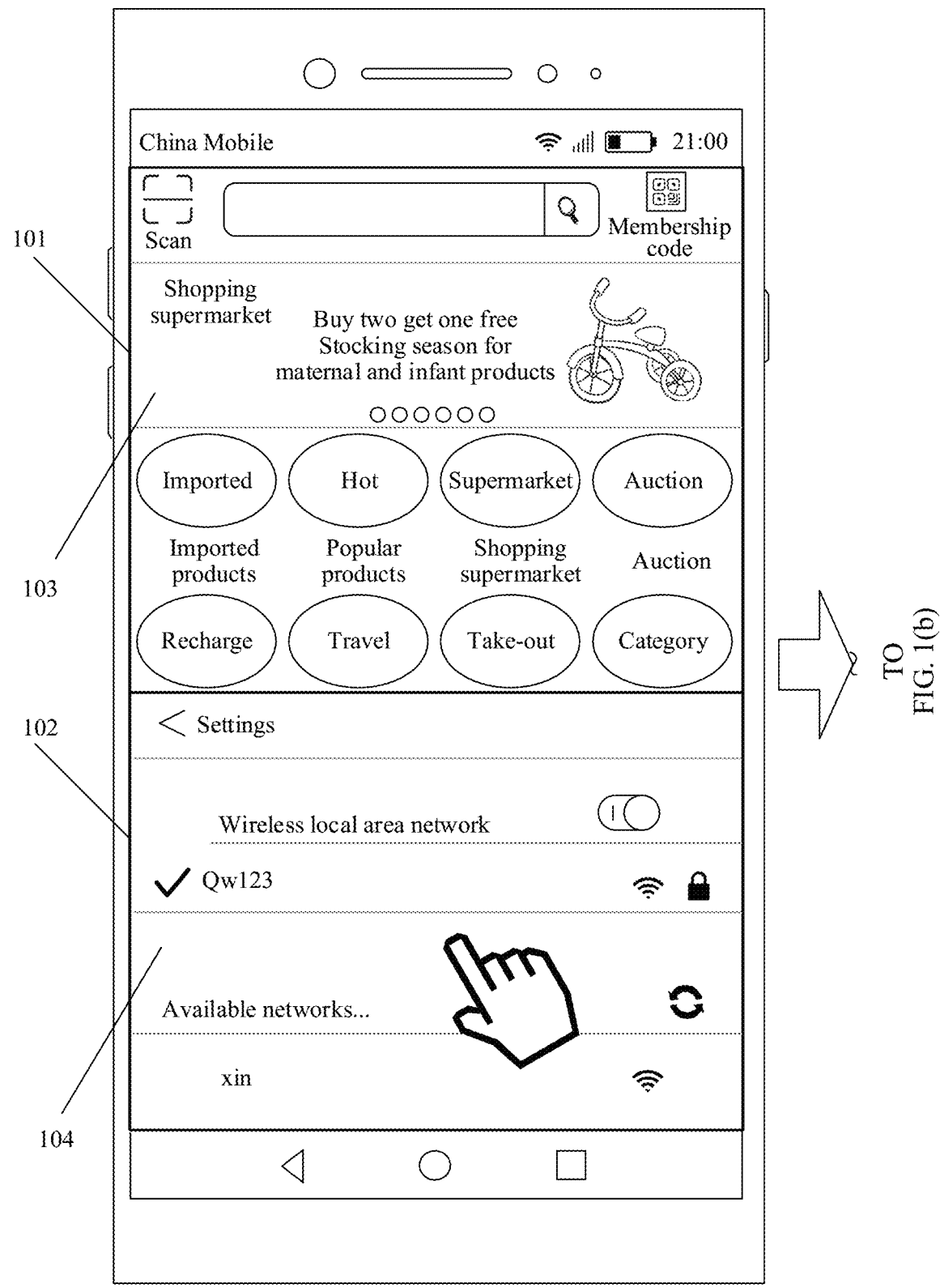
FIG. 1(a), FIG. 1(b), and FIG. 1(c) are schematic diagrams of an interface during split-screen display in the conventional technology.
Figure 1B:
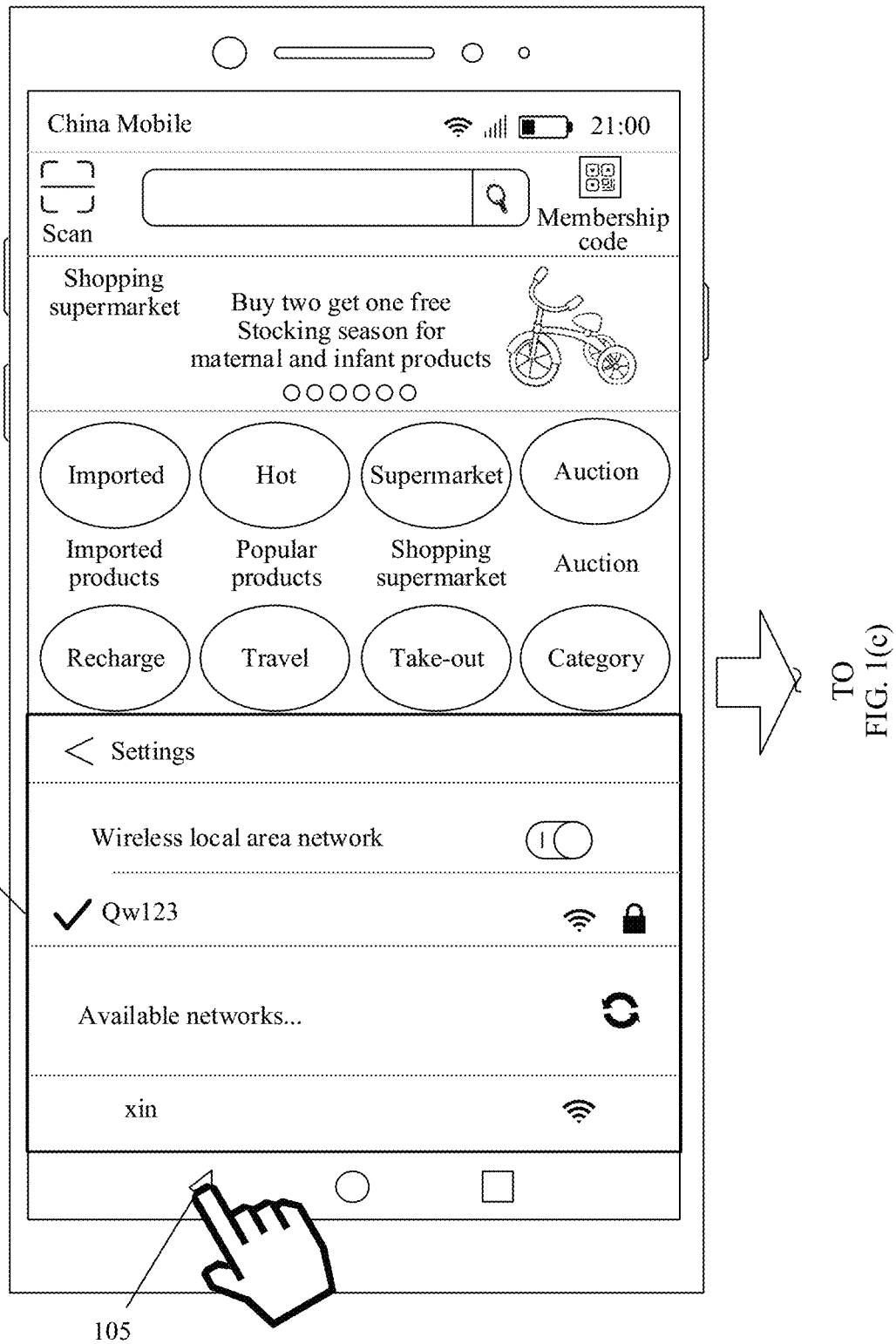
Figure 1C:
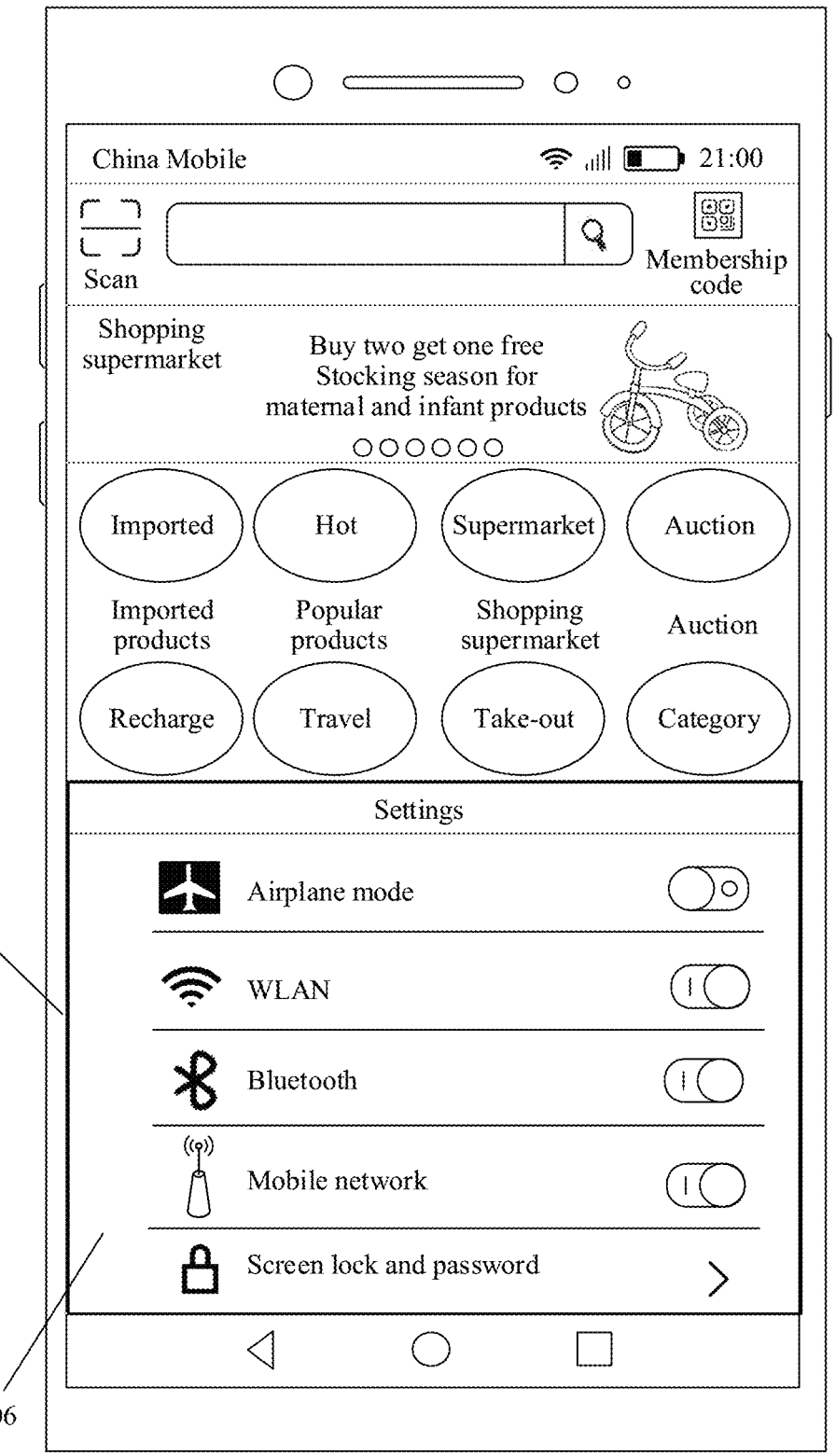

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "multiple" means two or more than two.

The embodiments of this application provide an operation method for split-screen display. The method may be applied to an electronic device. The electronic device supports a function of split-screen display. A plurality of applications may be installed in the electronic device. During split-screen display, the electronic device may divide a touchscreen of the electronic device into a plurality of display areas, and respectively display interfaces of different applications in the electronic device in the plurality of display areas. In the embodiments of this application, a user may perform an operation such as going back to a previous interface or exiting an application in the plurality of display areas on the touchscreen of the electronic device without performing a series of operations. This reduces complexity of a user operation, improves use efficiency of the electronic device, and implements efficient interaction between the electronic device and the user.

The application in the embodiments of this application may be an embedded application (namely, a system application of the electronic device) or a downloadable application. The embedded application is an application provided as a part of an implementation of the electronic device. The downloadable application is an application that can provide an internet protocol multimedia subsystem (IMS) connection of the downloadable application. The downloadable application may be an application preinstalled in the electronic device, or may be a third-party application downloaded and installed by the user in the electronic device.

It should be noted that the electronic device in the embodiments of this application may be a device such as a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR)/virtual reality (VR) device, or a media player. A specific form of the device is not limited in the embodiments of this application.

In addition, the electronic device in the embodiments of this application may be an electronic device with a non-foldable screen or an electronic device with a foldable screen.

The electronic device with a foldable screen may be an electronic device that includes a foldable screen. In some embodiments, the foldable screen may be a flexible foldable screen. The flexible foldable screen includes a folding edge. Some or all parts of the flexible foldable screen may be made of a flexible material. For example, in the flexible foldable screen, only a foldable part (for example, the folding edge) is made of the flexible material, and other parts are made of a rigid material. Alternatively, all parts of the flexible foldable screen are made of the flexible material. The foldable screen may be folded into a plurality of (two or more) screens along the folding edge. In some other embodiments, the foldable screen may be a multi-screen foldable screen. The multi-screen foldable screen may include a plurality of (two or more) screens. It should be noted that the plurality of screens are a plurality of independent touchscreens. The plurality of screens may be sequentially connected by using a folding shaft. Each screen may rotate around a folding shaft connected to the screen, to implement folding of the multi-screen foldable screen. For example, with reference to FIG. 2(a), FIG. 2(b), and FIG. 2(c), the foldable screen is a flexible foldable screen. After the flexible foldable screen shown in FIG. 2(a) is folded along the folding edge, a screen A 201 and a screen B 202 shown in FIG. 2(b) may be formed. FIG. 2(a) is a schematic diagram of a form of the foldable screen that is not folded. FIG. 2(b) is a schematic diagram of a form of the flexible foldable screen that is folded (half-folded). FIG. 2(c) is a schematic diagram of a form of the flexible foldable screen that is completely folded. It should be noted that in FIG. 2(a), FIG. 2(b), and FIG. 2(c), the foldable screen of the electronic device is vertically folded, to implement folding of the foldable screen. Certainly, the foldable screen of the electronic device may alternatively be horizontally folded, to implement folding of the foldable screen. The embodiments constitute no limitation herein.

The following describes the implementations of the embodiments of this application in detail with reference to accompanying drawings.

Figure 3:
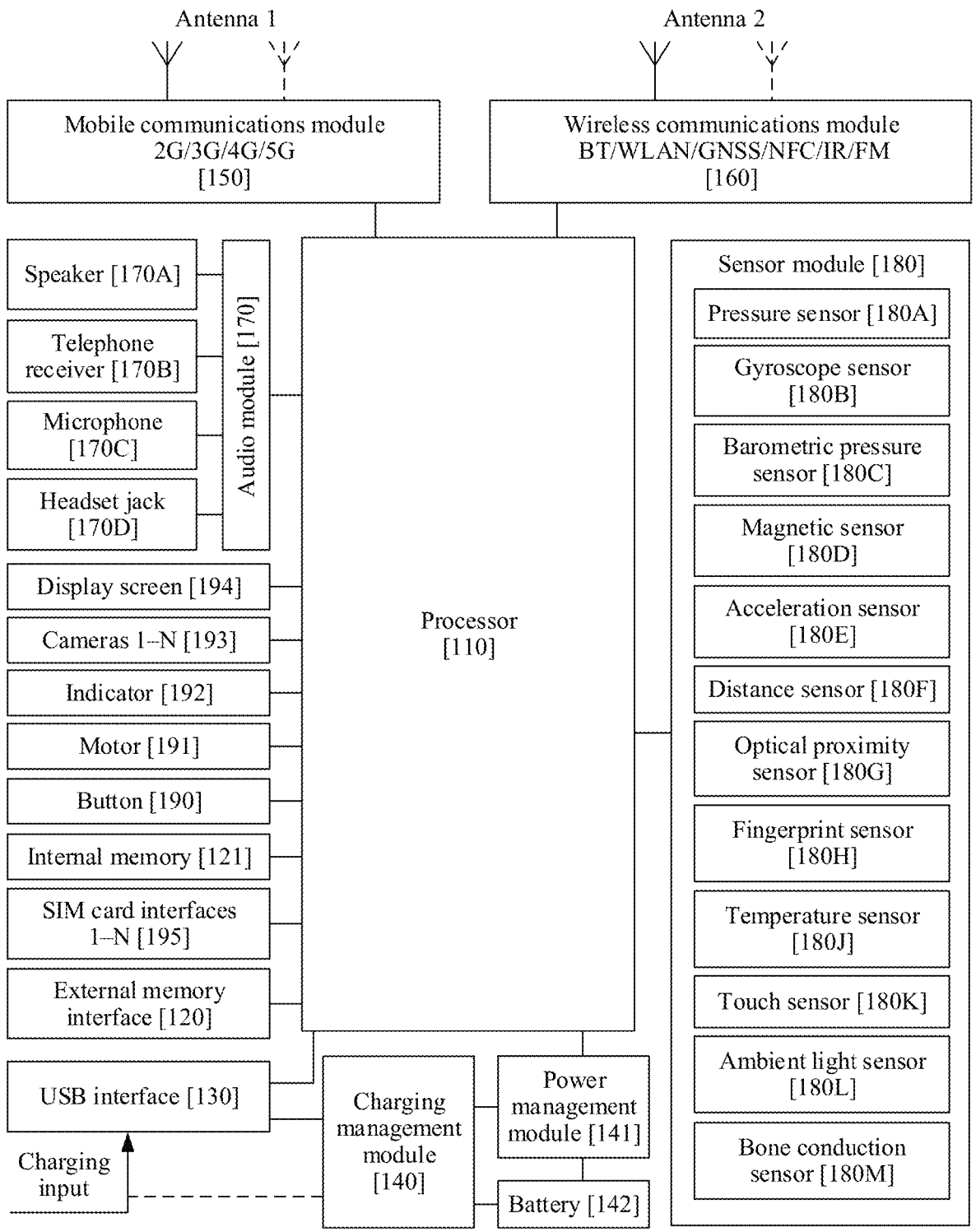
FIG. 3 is a schematic structural diagram of an electronic device according to an embodiment of this application.

FIG. 3 is a schematic structural diagram of an electronic device according to an embodiment of this application. As shown in FIG. 3, the electronic device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment constitutes no specific limitation on the electronic device. In some other embodiments, the electronic device may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the electronic device. The controller may generate an operation control signal based on instruction operation code and a time sequence signal, to complete control of instruction reading and instruction execution.

A memory may be further disposed in the processor 110, to store an instruction and data. In some embodiments, the memory in the processor 110 is a cache. The memory may store an instruction or data that has been just used or cyclically used by the processor 110. If the processor 110 needs to use the instruction or the data again, the processor 110 may directly invoke the instruction or the data from the memory, to avoid repeated access, and reduce a waiting time of the processor 110, thereby improving system efficiency.

In some embodiments, the processor 110 may include one or more interfaces. The interface may be an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that a schematic interface connection relationship between the modules in this embodiment is merely an example for description, and constitutes no limitation on the structure of the electronic device. In some other embodiments, the electronic device may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments in which the charger is a wired charger, the charging management module 140 may receive a charging input from the wired charger through the USB interface 130. In some embodiments in which the charger is a wireless charger, the charging management module 140 may receive a charging input from the wireless charger through a wireless charging coil of the electronic device. When charging the battery 142, the charging management module 140 may further supply power to the electronic device by using the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may be alternatively disposed in a same component.

A wireless communications function of the electronic device may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into an intermediate/high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the telephone receiver 170B, and the like), or displays an image or a video on the display screen 194. In some embodiments, the modem processor may be an independent component. In some other embodiments, the modem processor may be independent of the processor 110, and the modem processor and the mobile communications module 150 or another functional module are disposed in a same component.

The wireless communications module 160 may provide a solution to wireless communication applied to the electronic device, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components into which at least one communication processing module is integrated. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device implements a display function by using the GPU, the display screen 194, the application processor, and the like. The GPU is a microprocessor for image processing, and connects to the display screen 194 and the application processor. The GPU is configured to perform mathematical and geometrical calculation, and is configured to perform graphics rendering. The processor 110 may include one or more GPUs, and execute a program instruction to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a mini Led, a micro-LED, a micro-OLED, a quantum dot light emitting diode (QLED), or the like. In some embodiments, the electronic device may include one or N display screens 194, where N is a positive integer greater than 1.

The electronic device may implement a photographing function by using the ISP, the camera 193, the video codec, the GPU, the display screen 194, the application processor, and the like.

The ISP is configured to process data fed back by the camera 193. For example, during photo taking, a shutter is pressed, a ray of light is transmitted to a light-sensitive element of the camera through a lens, an optical signal is converted into an electrical signal, and the light-sensitive element of the camera transmits the electrical signal to the ISP for processing. The ISP converts the electrical signal into an image that can be seen. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and the image is projected to the light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may further process another digital signal in addition to a digital image signal. For example, when the electronic device performs frequency selection, the digital signal processor is configured to perform Fourier transform and the like on frequency energy.

The video codec is configured to compress or decompress a digital video. The electronic device may support one or more video codecs. In this way, the electronic device may play or record videos in a plurality of encoding formats, for example, moving picture experts group (MPEG)-1, MPEG-2, MPEG-3, and MPEG-4.

The NPU is a neural network (NN) processing unit, and quickly processes input information by using a biological neural network structure such as a mode of transmission between human-brain nerve cells, and may further constantly perform self-learning. The NPU may be used to implement an application such as intelligent cognition of the electronic device, for example, image recognition, facial recognition, voice recognition, and text understanding.

The external memory interface 120 may be configured to connect to an external storage card such as a micro SD card, to extend a storage capability of the electronic device. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications and data processing of the electronic device. For example, in this embodiment of this application, during split-screen display, the processor 110 may execute the instructions stored in the internal memory 121. When receiving a touch operation performed by a user in a display area on a touchscreen, in response to the touch operation, the processor 110 executes a corresponding event, for example, enables an application displayed in the display area to exit, switches an application displayed in the display area to a background for running, or goes back to a previous-level interface of an interface of an application displayed in the display area. The internal memory 121 may include a program storage area and a data storage area. The program storage area may store an operating system, an application required by at least one function (for example, a sound playing function and an image playing function), and the like. The data storage area may store data (for example, audio data and an address book) and the like created when the electronic device is used. In addition, the internal memory 121 may include a high-speed random access memory, and may further include a nonvolatile memory such as at least one magnetic disk storage device, a flash memory, or a universal flash storage (UFS).

The electronic device may implement an audio function such as music playing or recording by using the audio module 170, the speaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A is also referred to as a "speaker", and is configured to convert an audio electrical signal into a sound signal. The electronic device may be used to listen to music or answer a call in a hands-free mode by using the speaker 170A.

The telephone receiver 170B is also referred to as a "receiver", and is configured to convert an audio electrical signal into a sound signal. When the electronic device is used to answer a call or receive voice information, the telephone receiver 170B may be put close to a human ear, to receive the voice information.

The microphone 170C is also referred to as "microphone", and is configured to convert a sound signal into an electrical signal. When making a call, sending voice information, or needing to trigger, by using a voice assistant, the electronic device to perform some functions, a user may make a sound by putting the mouth close to the microphone 170C, and input a sound signal to the microphone 170C. At least one microphone 170C may be disposed in the electronic device. In some other embodiments, two microphones 170C may be disposed in the electronic device, to collect a sound signal and implement a noise reduction function. In some other embodiments, three, four, or more microphones 170C may be alternatively disposed in the electronic device, to collect a sound signal, implement noise reduction, recognize a sound source, implement a directional recording function, and so on.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device determines strength of pressure based on a change of the capacitance. When a touch operation is performed on the display screen 194, the electronic device detects strength of the touch operation by using the pressure sensor 180A. The electronic device may further calculate a touch position based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device. In some embodiments, the gyroscope sensor 180B may be used to determine angular velocities of the electronic device around three axes (namely, axes x, y, and z). The gyroscope sensor 180B may be configured to perform image stabilization during photo taking. For example, when a shutter is pressed, the gyroscope sensor 180B detects a jitter angle of the electronic device, calculates, based on the angle, a distance for which a lens module needs to compensate, and enables the lens to offset jitter of the electronic device through reverse motion, to implement image stabilization. The gyroscope sensor 180B may be further used for a navigation scenario and a motion sensing game scenario.

The barometric pressure sensor 180C is configured to measure atmospheric pressure. In some embodiments, the electronic device calculates an altitude by using the atmospheric pressure measured by the barometric pressure sensor 180C, to assist in positioning and navigation.

The magnetic sensor 180D includes a Hall effect sensor. The electronic device may detect opening and closing of a flip holster by using the magnetic sensor 180D. In some embodiments, when the electronic device is a flip device, the electronic device may detect opening and closing of a flip cover by using the magnetic sensor 180D, to set a feature such as automatic unlocking of the flip cover based on a detected opening/closing state of the holster or a detected opening/closing state of the flip cover.

The acceleration sensor 180E may detect magnitude of acceleration of the electronic device in various directions (usually on three axes). When the electronic device is still, a magnitude and a direction of gravity may be detected. The acceleration sensor 180E may be further configured to recognize a posture of the electronic device, and is applied to an application such as switching between landscape orientation and portrait orientation and a pedometer.

The distance sensor 180F is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The electronic device may emit infrared light by using the light emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user puts the electronic device close to an ear for making a call, so that automatic screen-off is implemented to achieve power saving. The optical proximity sensor 180G may be further configured to automatically unlock and lock the screen in a holster mode or a pocket mode.

The ambient light sensor 180L is configured to sense brightness of ambient light. The electronic device may adaptively adjust brightness of the display screen 194 based on the sensed brightness of the ambient light. The ambient light sensor 180L may be further configured to automatically adjust white balance during photo taking. The ambient light sensor 180L may further cooperate with the optical proximity sensor 180G to detect whether the electronic device is in a pocket, so as to avoid an unintentional touch.

The fingerprint sensor 180H is configured to collect a fingerprint. The electronic device may implement fingerprint unlocking, application lock access, fingerprint photographing, fingerprint-based call answering, and the like by using a feature of the collected fingerprint.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed in the display screen 194, and the touch sensor 180K and the display screen 194 form a touchscreen, which is also referred to as a "touchscreen". When the electronic device is an electronic device with a foldable screen, the touchscreen is the foldable screen (for example, a flexible foldable screen or a multi-screen foldable screen). The touch sensor 180K is configured to detect a touch operation performed on or near the touch sensor 180K. The touch sensor 180K may transmit the detected touch operation to the application processor, to determine a touch event type. The touch sensor 180K may provide a visual output related to the touch operation on the display screen 194. In some other embodiments, the touch sensor 180K may be alternatively disposed on a surface of the electronic device, and is located at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may further come into contact with a human pulse, and receive a blood pressure beating signal. In some embodiments, the bone conduction sensor 180M may be alternatively disposed in a headset, to obtain a bone conduction headset. The audio module 170 may obtain a voice signal through parsing based on the vibration signal, of the vibration bone of the vocal-cord part, that is obtained by the bone conduction sensor 180M, to implement a voice function. The application processor may obtain heart rate information through parsing based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to user setting and function control of the electronic device.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. Touch operations performed in different areas of the display screen 194 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device. The electronic device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be alternatively compatible with different types of SIM cards. The SIM card interface 195 may be also compatible with an external storage card. The electronic device interacts with a network by using the SIM card, to implement functions such as a call function and data communication. In some embodiments, the electronic device uses an eSIM, namely, an embedded SIM card. The eSIM card may be embedded into the electronic device, and cannot be separated from the electronic device.

All methods in the following embodiments may be implemented in an electronic device with the foregoing hardware structure.

Figure 4:
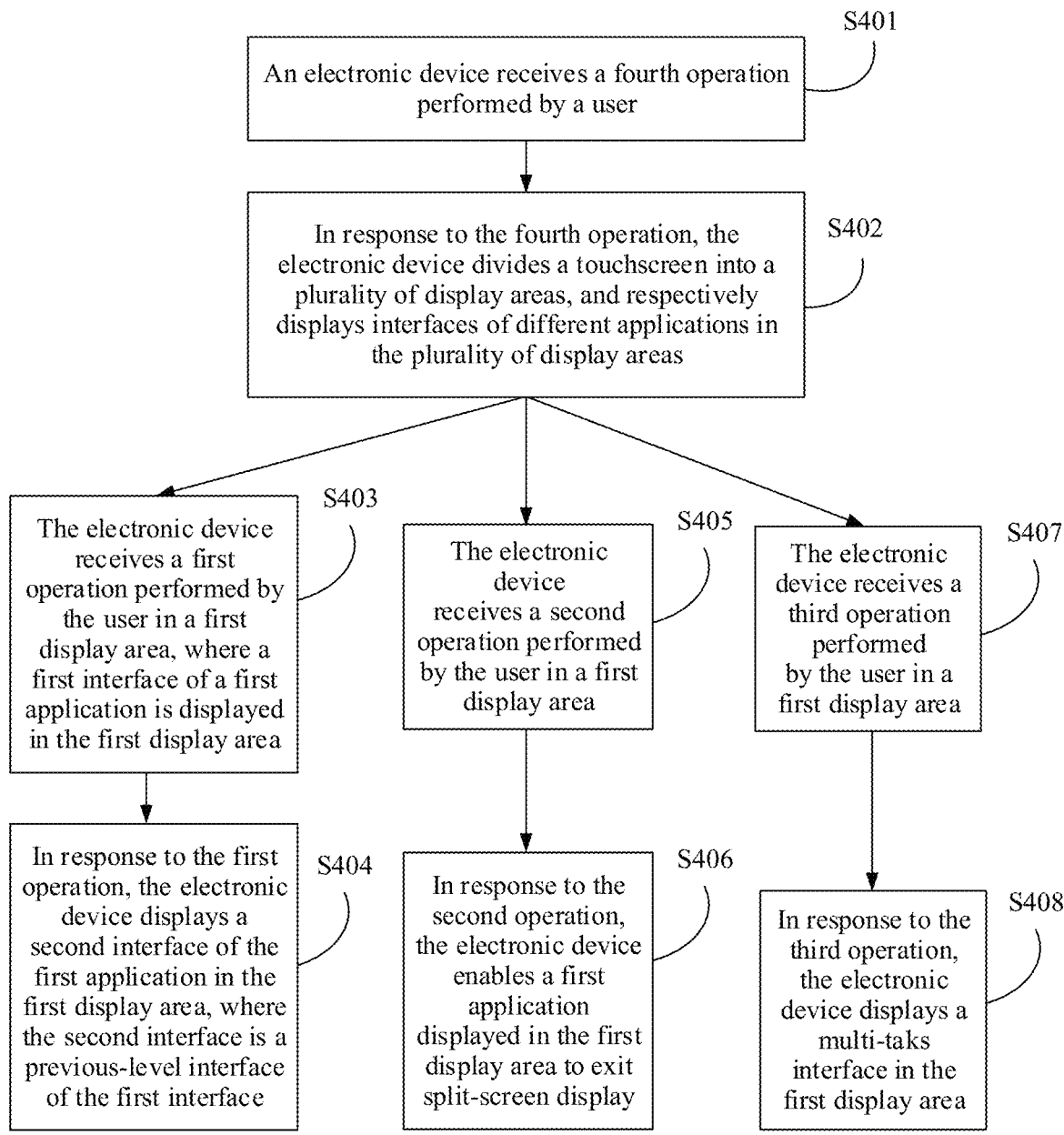
FIG. 4 is a schematic flowchart of an operation method for split-screen display according to an embodiment of this application.

FIG. 4 is a schematic flowchart of an operation method for split-screen display according to an embodiment of this application. The method may be applied to an electronic device that supports a split-screen display function. During split-screen display, the electronic device may divide a touchscreen of the electronic device into a plurality of display areas, and respectively display interfaces of different applications in the electronic device in the plurality of display areas. As shown in FIG. 4, the method may include the following operations S401 to S408.

S401. The electronic device receives a fourth operation performed by a user.

The fourth operation may include one or more operations, and is used to trigger split-screen display of the electronic device.

S402. In response to the fourth operation, the electronic device divides the touchscreen into a plurality of display areas, and respectively displays interfaces of different applications in the plurality of display areas.

For example, as shown in FIG. 5(*a*), an interface 501 of WeChat is currently displayed on the touchscreen of the electronic device. When the user wants to use the split-screen display function, the user may make a specific gesture, for example, double-tap the touchscreen of the electronic device. In response to the specific gesture, as shown in FIG. 5(*b*), the electronic device may divide the touchscreen into a plurality of display areas, for example, into two display areas: a display area 1 and a display area 2, display the interface 501 of WeChat in the display area 1, and display, in the display area 2, an identifier of an application that can be used for implementing split-screen display with WeChat, for example, an icon of the application or a thumbnail of the application. For example, the icon of the application that can be used for implementing split-screen display with WeChat is displayed in the display area 2. For example, as shown in FIG. 5(*b*), an icon of a "camera", an icon of a "settings application", an icon of a "calculator", an icon of an "album", an icon of "weather", and an icon 502 of a "music player" are displayed in the display area 2. The user may select an application from the icons displayed in the display area 2, to implement split-screen display with WeChat. For example, the user selects the music player. As shown in FIG. 5(*b*), the user may perform a tap operation on the icon 502 of the "music player". In response to the tap operation, as shown in FIG. 5(*c*), the electronic device may display an interface 503 of the music player in the display area 2. Both the interface 503 and the interface 501 are displayed on the touchscreen, that is, split-screen display is implemented. The specific gesture and the tap operation are the fourth operation.

It may be understood that in the example in FIG. 5(*a*), FIG. 5(*b*), and FIG. 5(*c*), the electronic device divides the touchscreen into two display areas, and displays interfaces of two different applications in the two display areas. Certainly, during split-screen display, the electronic device may alternatively divide the touchscreen into at least two display areas, and respectively display interfaces of different applications in the at least two display areas. For example, when the user wants to simultaneously display interfaces of three or more applications on the touchscreen, the user may make the gesture and perform the operation in the example shown in FIG. 5(*a*), FIG. 5(*b*), and FIG. 5(*c*) for a plurality of times, to simultaneously display the interfaces of the three or more applications on the touchscreen of the electronic device. Alternatively, when receiving the specific gesture in the example shown in FIG. 5(*a*), FIG. 5(*b*), and FIG. 5(*c*), the electronic device may divide the touchscreen into three or more display areas, and may display, in one or more of the display areas, an identifier of an application that can be used for implementing split-screen display, and the user may drag an identifier of a different application to the display area obtained through division. In this way, interfaces of three or more applications can be simultaneously displayed on the touchscreen of the electronic device. For example, as shown in FIG. 6, during split-screen display, the electronic device divides the touchscreen into four display areas: a display area 1, a display area 2, a display area 3, and a display area 4. In addition, an interface 601 of WeChat is displayed in the display area 1, an interface 602 of a music player is displayed in the display area 2, an interface 603 of a settings application is displayed in the display area 3, and an interface 604 of a camera is displayed in the display area 4.

In addition, the user may adjust a size of a display area by dragging a division line between different display areas or an application isolation bar (or referred to as an application separator) on a division line, to adjust a size of an interface of an application displayed in the display area. For example, with reference to FIG. 6, the user may adjust sizes of the display area 1, the display area 2, and the display area 3 by horizontally dragging an application isolation bar 1, to adjust sizes of the interface 601 of WeChat, the interface 602 of the music player, and the interface 603 of the settings application. The user may adjust sizes of the display area 2 and the display area 3 by vertically dragging an application isolation bar 2, to adjust sizes of the interface 602 of the music player and the interface 603 of the settings application. The user may adjust sizes of the display area 2, the display area 3, and the display area 4 by horizontally dragging an application isolation bar 3, to adjust sizes of the interface 602 of the music player, the interface 603 of the settings application, and the interface 604 of the camera. It should be noted that the division line or the application isolation bar on the division line may be displayed on the touchscreen after the electronic device divides the touchscreen into a plurality of display areas, or may be displayed on the touchscreen only when a touch on a boundary of the display area is received from the user, and may be automatically hidden when the user stops touching the boundary of the display area. This embodiment constitutes no specific limitation herein.

Figure 5A:
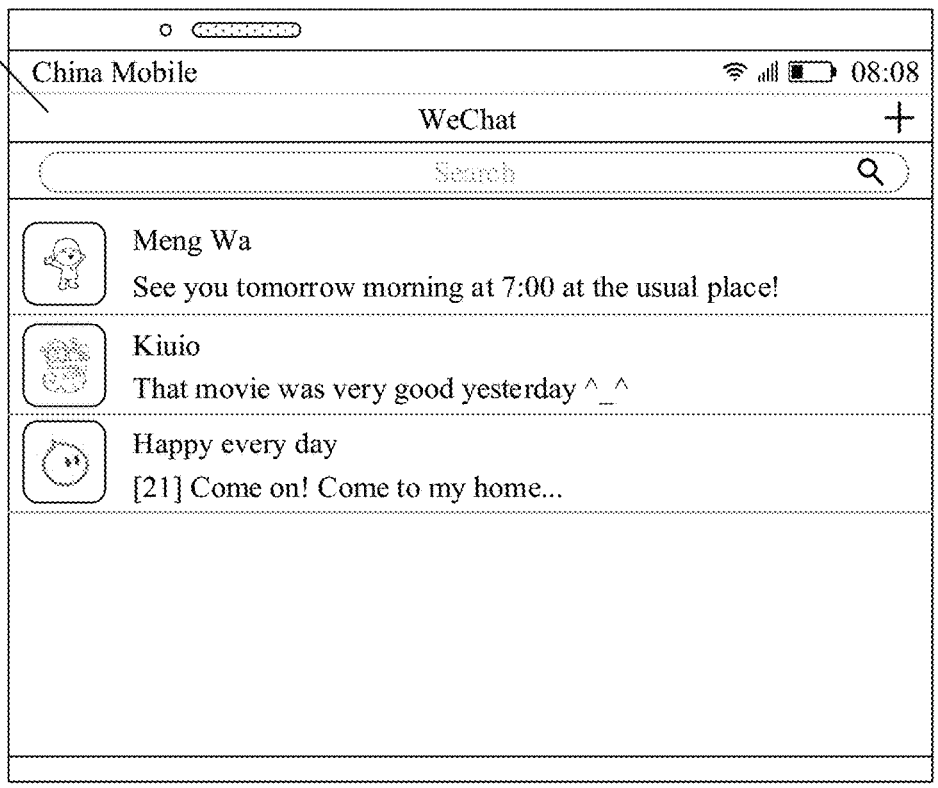
FIG. 5(a), FIG. 5(b), and FIG. 5(c) are schematic diagrams of an interface during split-screen display according to an embodiment of this application.
Figure 5B:
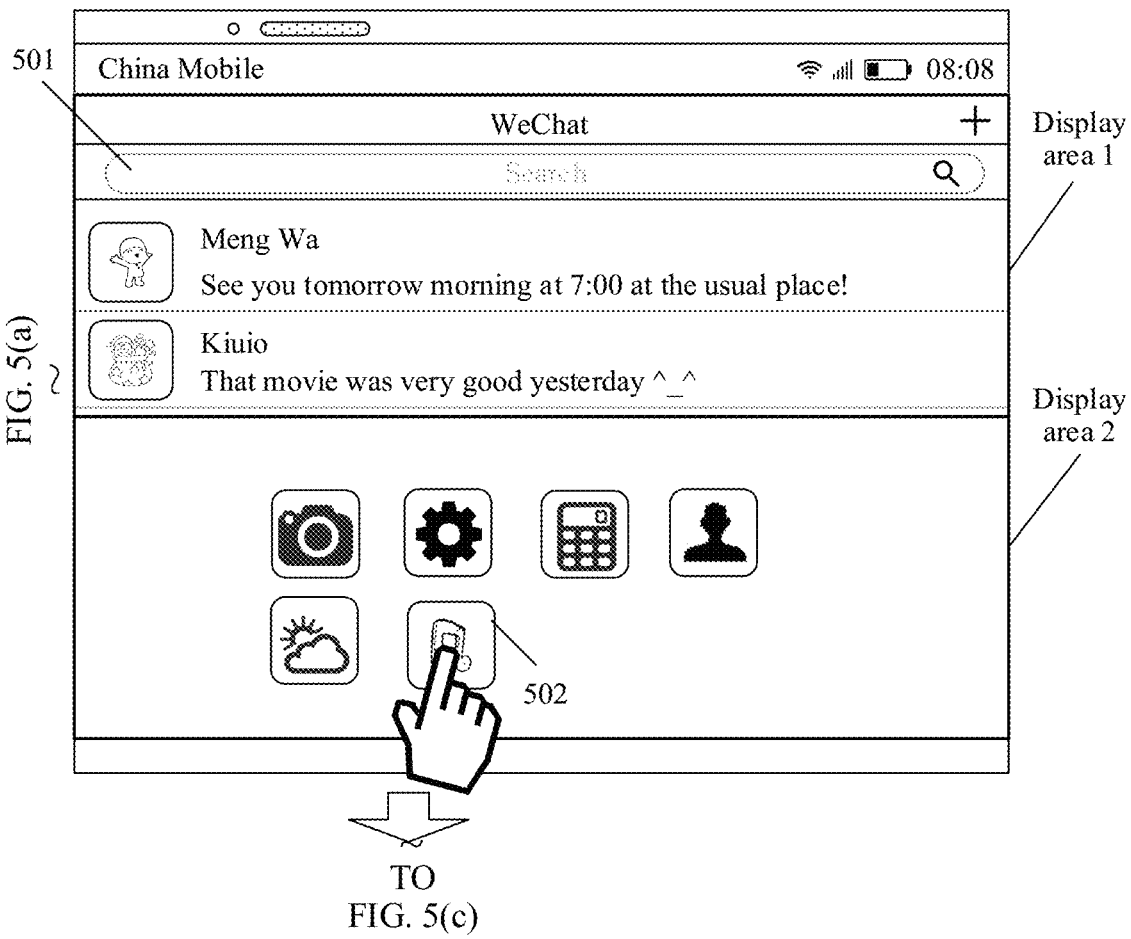
Figure 5C:
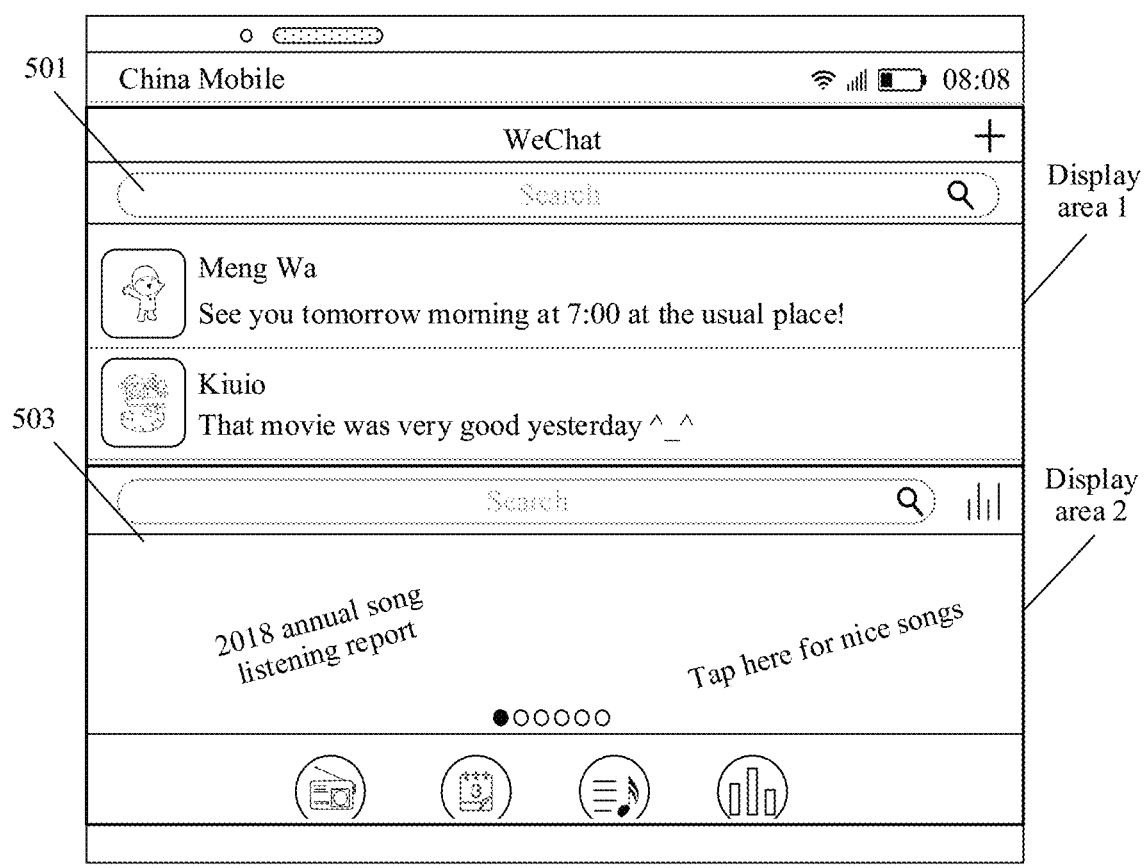
Figure 6:
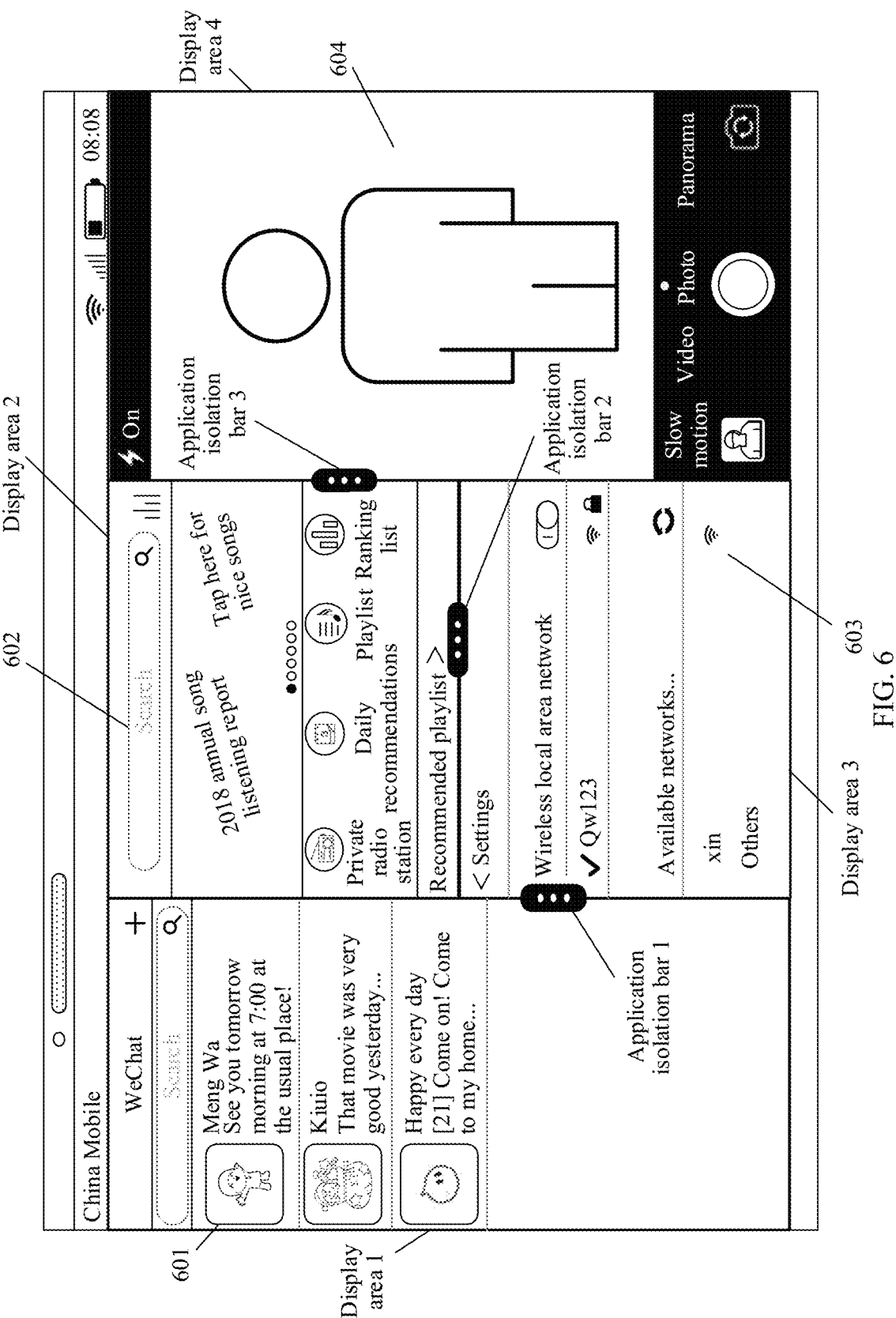
FIG. 6 is another schematic diagram of an interface during split-screen display according to an embodiment of this application.

It should be noted that the fourth operation is not limited to the gesture and the operation in the example shown in FIG. 5(a), FIG. 5(b), and FIG. 5(c), and may alternatively be another operation used to trigger split-screen display of the electronic device. This embodiment constitutes no specific limitation herein.

In this embodiment, during split-screen display, the user may perform a corresponding operation in the display area obtained through division by the electronic device, to trigger the electronic device to execute a corresponding event for an application displayed in the display area.

The electronic device may execute different events in response to different operations. It should be noted that in this embodiment, an event to be executed by the electronic device in response to a different operation performed by the user may be predefined or preconfigured in the electronic device, or may be set by the user. That is, that a specific operation triggers the electronic device to execute a specific event may be predefined, or may be set by the user. If that a specific operation triggers the electronic device to execute a specific event is predefined or preconfigured in the electronic device, the electronic device may display prompt information (for example, the prompt information may be displayed when the electronic device starts split-screen display, or may be displayed when the user enables the split-screen display function of the electronic device), to prompt the user that a specific operation to be performed by the user may trigger the electronic device to correspondingly execute a specific event. If that a specific operation triggers the electronic device to execute a specific event is set by the user, a settings interface may be provided for the user to set that a specific operation to be performed may trigger the electronic device to execute a specific event.

For example, events executed by the electronic device based on different operations performed by the user are described in the following operations S403 to S408.

In some embodiments, when the electronic device receives a first operation performed by the user in a first display area, the electronic device may execute an event of going back to a previous-level interface for an application displayed in the first display area. For details, refer to the following operations S403 and S404.

S403. The electronic device receives the first operation performed by the user in the first display area, where a first interface of a first application is displayed in the first display area.

The first display area may be any one of the plurality of display areas in S402. For example, with reference to FIG. 6, the first display area may be any one of the display area 1, the display area 2, the display area 3, and the display area 4.

The first operation may be an operation of triggering the electronic device to go back to a previous interface of an application displayed in a corresponding display area (for example, the first display area).

For example, the first operation may be a sliding operation. For example, the first operation may be a sliding operation 1, a start point of the sliding operation 1 is a first edge of the first display area, a sliding direction is away from the first edge, and duration is less than or equal to first preset duration. A value range of the first preset duration may be [100 milliseconds (ms), 600 ms]. For example, the first preset duration is 200 ms. For another example, the first operation may be a sliding operation 2, a start point of the sliding operation 2 is a first edge of the first display area, a sliding direction is away from the first edge, and a sliding distance is less than or equal to a first preset distance. A value range of the first preset distance may be [1 centimeter (cm), 6 cm]. Still for another example, the first operation may be a sliding operation 3, a start point of the sliding operation 3 is a first edge of the first display area, a sliding direction is away from the first edge, and the sliding direction is a first preset direction. For example, an angle between the first preset direction and the first edge falls within a range of [45°, 135°]. Each of the sliding operation 1, the sliding operation 2, and the sliding operation 3 may be the first sliding operation in this application.

Figure 7:
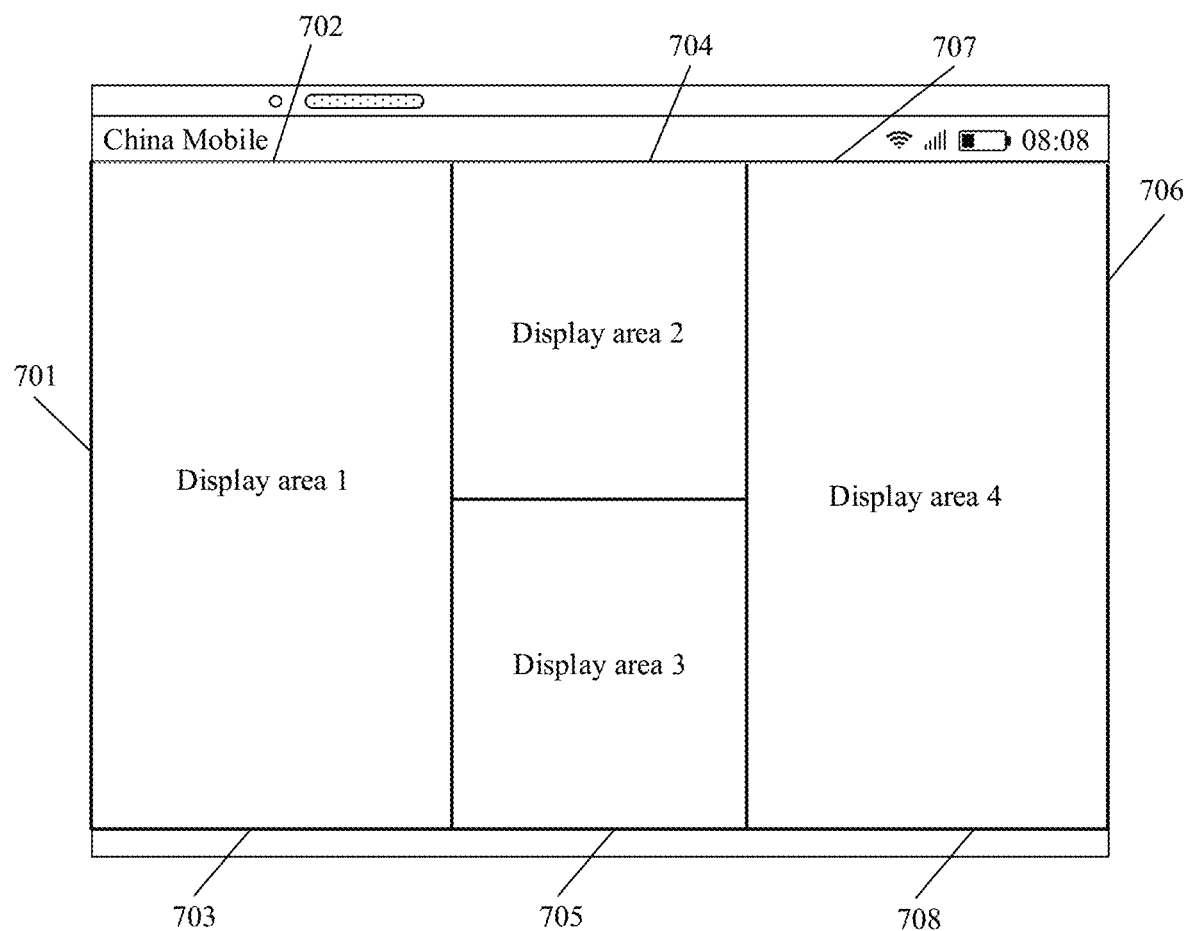
FIG. 7 is still another schematic diagram of an interface during split-screen display according to an embodiment of this application.

The first edge of the first display area is an edge of the first display area that is closely adjacent to an edge of the touchscreen. For example, as shown in FIG. 7, the first edge of the first display area is described with reference to FIG. 6. When the first display area is the display area 1 shown in FIG. 7, the first edge of the first display area may be an edge 701, an edge 702, or an edge 703. When the first display area is the display area 2 shown in FIG. 7, the first edge of the first display area may be an edge 704. When the first display area is the display area 3 shown in FIG. 7, the first edge of the first display area may be an edge 705. When the first display area is the display area 4 shown in FIG. 7, the first edge of the first display area may be an edge 706, an edge 707, or an edge 708.

It should be noted that the first operation may alternatively be another operation used to trigger the electronic device to go back to a previous interface of the application displayed in the corresponding display area, for example, a double-tap operation in the first display area. This embodiment constitutes no specific limitation herein. In addition, there may be one or more fingers for performing the first operation. This embodiment also constitutes no specific limitation herein.

S404. In response to the first operation, the electronic device displays a second interface of the first application in the first display area, where the second interface is a previous-level interface of the first interface.

After the electronic device receives the first operation performed by the user in the first display area, in response to the first operation, the electronic device may execute a corresponding event for the first application displayed in the first display area, for example, go back to the previous-level interface of the interface of the first application displayed in the first display area.

Figure 8B:
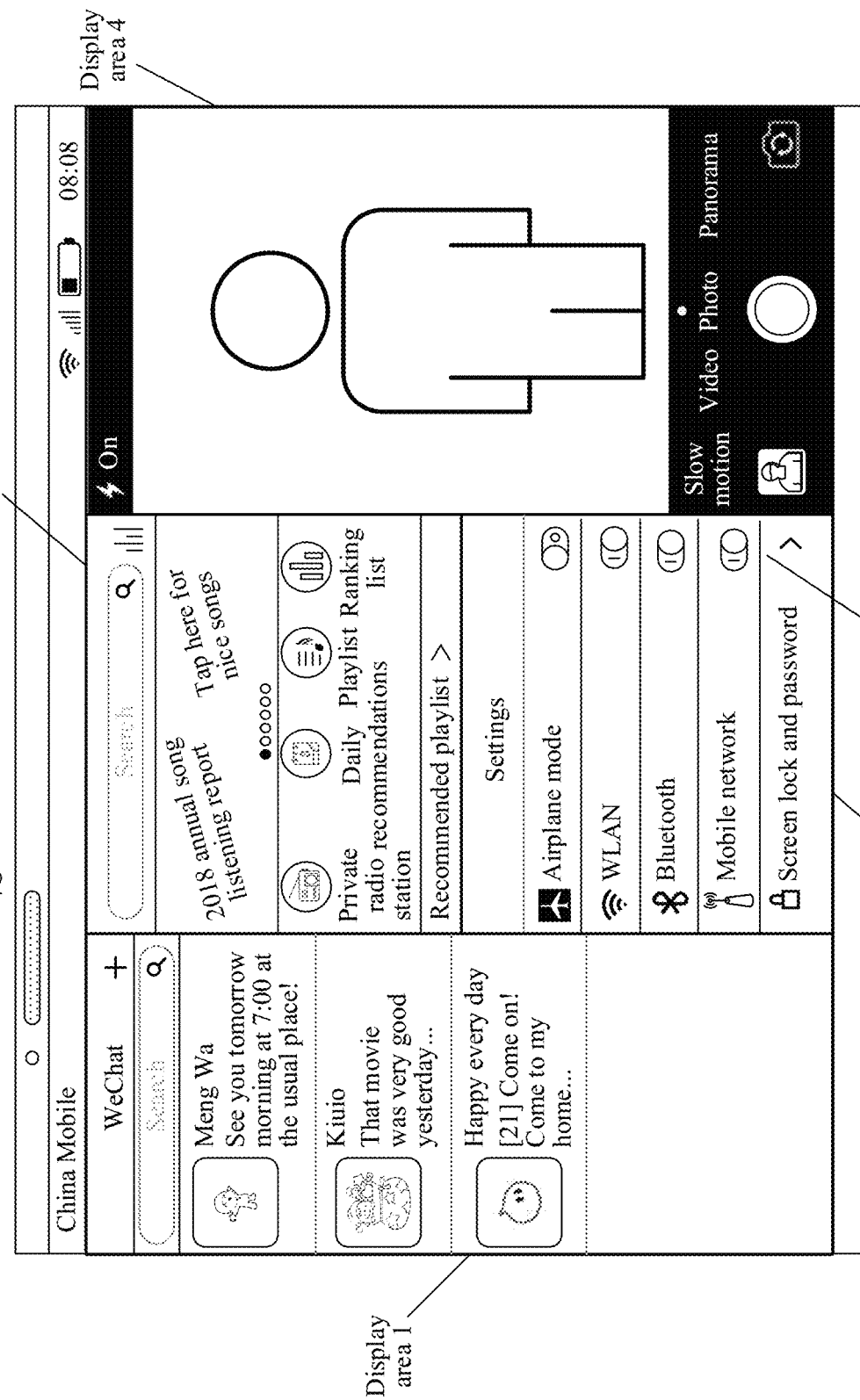

For example, with reference to FIG. 6, the first display area is the display area 3, there is one finger for performing the first operation, the first operation is the sliding operation 1, and the first preset duration is 200 ms. A first interface of the settings application is currently displayed in the display area 3 on the touchscreen of the electronic device, for example, a settings interface 801 of a wireless local area network shown in FIG. 8(a). When the user wants to perform going back to a previous interface of the settings application displayed in the display area 3, as shown in FIG. 8(a), the user may perform the first operation in the display area 3. That is, the user may perform a sliding operation from an edge 802 of the display area 3 that is closely adjacent to the edge of the touchscreen with a single finger in a direction away from the edge 802, and leave the touchscreen within 200 ms. In response to the first operation, as shown in FIG. 8(b), the electronic device may display a second interface of the settings application in the display area 3, for example, a main interface 803 of the settings application. That is, when the electronic device detects that the finger of the user slides in from the edge of the display area 3 that is closely adjacent to the edge of the touchscreen, and leaves the touchscreen within 200 ms, in response, the electronic device may execute an event of going back to a previous-level display interface for the settings application displayed in the display area 3. Interfaces displayed in other display areas such as the display area 1, the display area 2, and the display area 4 remain unchanged. In addition, in some embodiments, a time point at which the electronic device executes the event of going back to the previous-level display interface for the first application displayed in the first display area may be a moment at which the finger of the user leaves the touchscreen.

Alternatively, when the first interface is a home page of the first application, S404 may be replaced with the following operation: In response to the first operation, the electronic device enables the application displayed in the first display area to exit split-screen display. That is, if the home page of the application is displayed in the display area, because there is no previous-level interface for the home page, after the user performs the first operation in the display area, in response to the first operation, the electronic device may enable the application displayed in the display area to exit split-screen display, that is, no longer display the interface of the application on the touchscreen. Alternatively, when the home page of the application is displayed in the display area, if the first operation performed by the user in the display area is received, in response to the first operation, the electronic device may display prompt information. The prompt information is used to prompt the user that the application displayed in the display area is to exit split-screen display. A confirm button and a cancel button may be further displayed, and when a tap operation performed by the user on the confirm button is received, the application displayed in the display area is enabled to exit split-screen display. If a tap operation performed by the user on the cancel button is received, the home page of the application continues to be displayed in the display area.

It should be noted that in this embodiment, the event executed by the electronic device in response to the first operation performed by the user is not limited to the event of going back to the previous-level interface. In some embodiments, when the user performs the first operation in the first display area, the event executed by the electronic device in response to the first operation may be the same as or certainly may be different from an event executed by the electronic device after the user performs a tap operation on a back (back) button in a navigation bar when no split-screen display is implemented.

In some other embodiments, when the electronic device receives a second operation performed by the user in a first display area, the electronic device may execute an event of exiting split-screen display for an application displayed in the first display area. For details, refer to the following operations S405 and S406.

S405. The electronic device receives the second operation performed by the user in the first display area.

The second operation may be an operation of triggering the electronic device to exit split-screen display for an application displayed in a corresponding display area (for example, the first display area).

For example, the second operation may be a sliding operation. For example, the second operation may be a sliding operation 4, both a start point and an end point of the sliding operation 4 are the first edge of the first display area, a sliding direction is first away from the first edge, and then is toward the first edge, and sliding duration in a direction away from the first edge is less than or equal to second preset duration. For example, a value of the second preset duration may be [100 ms, 600 ms]. The value of the second preset duration may be the same as that of the first preset duration in S403. For example, the second preset duration is also 200 ms. For another example, the second operation may be a sliding operation 5, both a start point and an end point of the sliding operation 5 are the first edge of the first display area, a sliding direction is first away from the first edge, and then is toward the first edge, and a sliding distance in a direction away from the first edge is less than or equal to a second preset distance. A value range of the second preset distance may be [1 cm, 6 cm]. A value of the second preset distance may be the same as that of the first preset distance in S403. Still for another example, the second operation may be a sliding operation 6, a start point of the sliding operation 6 is the first edge of the first display area, a sliding direction is away from the first edge, and the sliding direction is a second preset direction. The second preset direction is different from the first preset direction in S403. For example, an angle between the second preset direction and the first edge falls within a range of [0°, 45°). For description of the first edge of the first display area, refer to the description in S403. Details are not described herein. Each of the sliding operation 4, the sliding operation 5, and the sliding operation 6 may be the second sliding operation in this application.

It should be noted that the second operation may alternatively be another operation used to trigger the electronic device to execute the event of exiting split-screen display for the application displayed in the corresponding display area, for example, a press and hold operation in the first display area. The second operation is different from the first operation in S403. This embodiment constitutes no specific limitation herein. In addition, there may be one or more fingers for performing the second operation. This embodiment also constitutes no specific limitation herein.

S406. In response to the second operation, the electronic device enables the first application displayed in the first display area to exit split-screen display.

After the electronic device receives the second operation performed by the user in the first display area, in response to the second operation, the electronic device may execute a corresponding event for the first application displayed in the first display area, for example, enable the first application displayed in the first display area to exit split-screen display.

That an application exits split-screen display means that an interface of the application is no longer displayed on an interface on which a plurality of applications are displayed in a split-screen display mode. For example, that the first application displayed in the first display area is enabled to exit split-screen display means that display of the interface of the first application is stopped on the touchscreen. For example, the electronic device may switch the first application to a background for running, to stop displaying the first application on the touchscreen. For another example, the electronic device may directly enable the first application to exit running, to stop displaying the first application on the touchscreen. In addition, in some embodiments, after the first application displayed in the first display area is enabled to exit split-screen display, a size of another display area may be adaptively adjusted, for example, the another display area may be enlarged, so that applications displayed in all other display areas can match a size of the touchscreen. For example, if the touchscreen of the electronic device includes only two display areas before the first application is enabled to exit split-screen display, after the first application displayed in the first display area is enabled to exit split-screen display, an interface of an application displayed in the other display area may be displayed on the touchscreen in full screen.

Figure 9A:
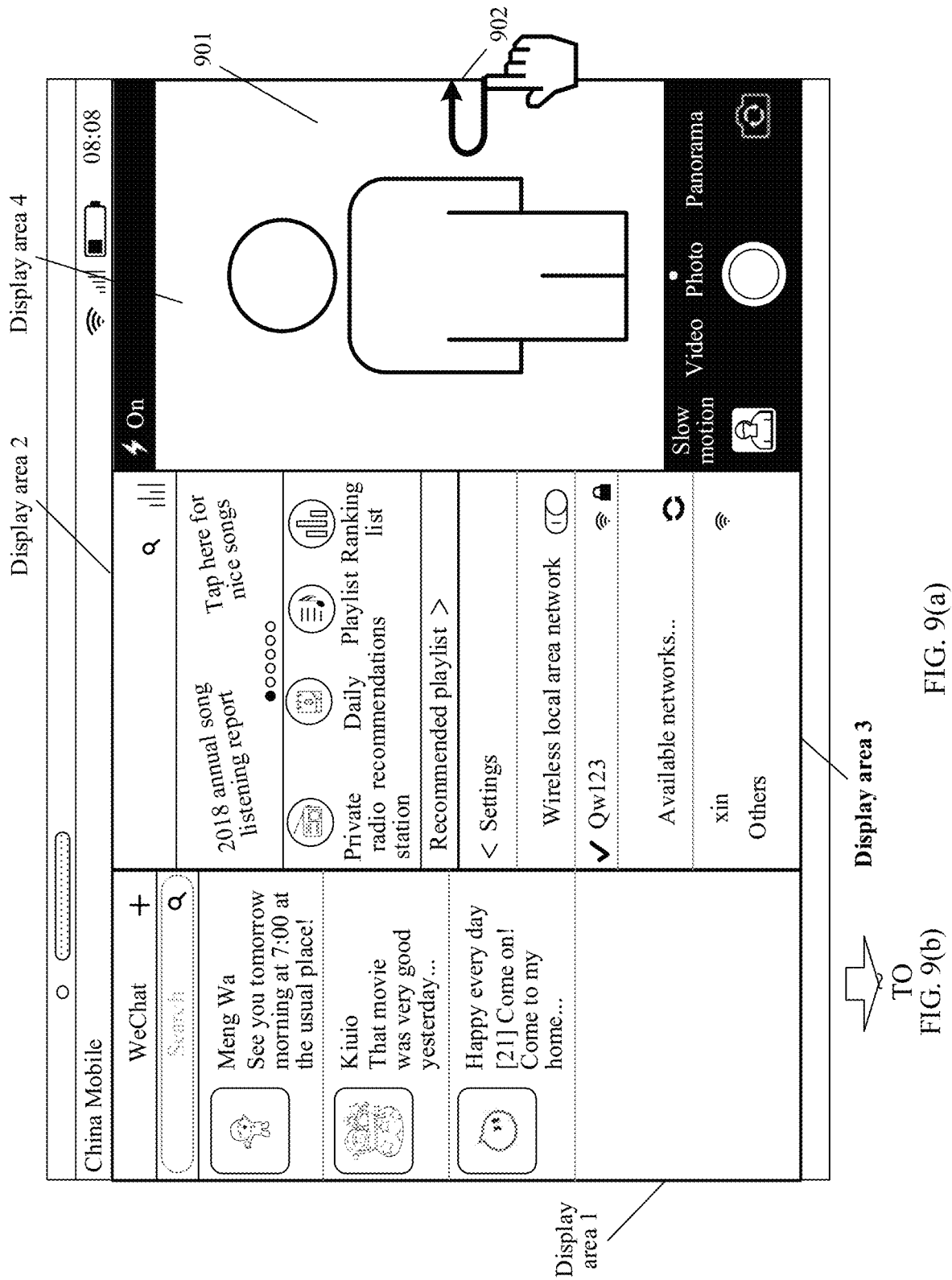

For example, with reference to FIG. 6, the first display area is the display area 4, there is one finger for performing the second operation, the second operation is the sliding operation 4, and the second preset duration is 200 ms. An interface of the camera is currently displayed in the display area 4 on the touchscreen of the electronic device, for example, an interface 901 of the camera shown in FIG. 9(a). When the user wants to enable the camera application to exit split-screen display, as shown in FIG. 9(a), the user may perform the second operation in the display area 4. That is, the user may first slide from an edge 902 of the display area 4 that is closely adjacent to the edge of the touchscreen with a single finger in a direction away from the edge 902, and then slide in a direction toward the edge 902 within 200 ms until the finger slips out of the edge 902. In response to the second operation, the electronic device may enable the camera application displayed in the display area 4 to exit split-screen display. That is, as shown in FIG. 9(b), the electronic device stops displaying the interface 901 of the camera on the touchscreen. For interfaces displayed in other display areas, the electronic device may adaptively adjust sizes of one or more of the display areas (for example, enlarge the display area). As shown in FIG. 9(b), the electronic device may increase sizes of the display area 1, the display area 2, and the display area 3, so that the applications displayed in the display area 1, the display area 2, and the display area 3 can match the size of the touchscreen. That is, when the electronic device detects that the finger of the user slides in from the edge of the display area 4 that is closely adjacent to the edge of the touchscreen, and slides out of the edge of the touchscreen in an opposite direction within 200 ms, in response, the electronic device may execute an event of exiting split-screen display for the camera application displayed in the display area 4, and does not execute the event of exiting split-screen display for applications displayed in the other display areas, for example, the applications displayed in the display area 1, the display area 2, and the display area 3. In addition, in some embodiments, a time point at which the electronic device executes the event of exiting split-screen display for the first application displayed in the first display area may be a moment at which the finger of the user slides out of the edge of the touchscreen.

It should be noted that in this embodiment, the event executed by the electronic device in response to the second operation performed by the user is not limited to the event of exiting split-screen display. In some embodiments, when the user performs the second operation in the first display area, the event executed by the electronic device in response to the second operation may be the same as or certainly may be different from an event executed by the electronic device after the user performs a tap operation on a home (home) button in a navigation bar when no split-screen display is implemented.

In some other embodiments, when the electronic device receives a third operation performed by the user in a first display area, the electronic device may display a multi-task interface in the first display area. For details, refer to the following operations S407 and S408.

S407. The electronic device receives the third operation performed by the user in the first display area.

The third operation may be an operation of triggering the electronic device to display the multi-task interface in a corresponding display area (for example, the first display area).

For example, the third operation may be a sliding operation. For example, the third operation may be a sliding operation 7, a start point of the sliding operation 7 is the first edge of the first display area, a sliding direction is away from the first edge, and duration is greater than third preset duration. Alternatively, a start point of the sliding operation 7 is the first edge of the first display area, a sliding direction is away from the first edge, duration is greater than a third preset time, and there is a pause of predetermined duration after sliding. That is, the electronic device first detects a sliding operation, and continuously detects a press and hold operation. For example, a value range of the third preset duration may be [100 ms, 600 ms]. A value of the third preset duration may be the same as that of the first preset duration in S403. For example, the third preset duration is 200 ms. For another example, the third operation may be a sliding operation 8, a start point of the sliding operation 8 is the first edge of the first display area, a sliding direction is away from the first edge, and a sliding distance is greater than a third preset distance. A value range of the third preset distance may be [1 cm, 6 cm]. A value of the third preset distance may be the same as that of the first preset distance in S403. Still for another example, the third operation may be a sliding operation 9, a start point of the sliding operation 9 is the first edge of the first display area, a sliding direction is away from the first edge, and the sliding direction is a third preset direction. The third preset direction is different from the first preset direction in S403 and the second preset direction in S405. For example, an angle between the third preset direction and the first edge falls within a range of (135°, 180°]. For description of the first edge of the first display area, refer to the description in S403. Details are not described herein. Each of the sliding operation 7, the sliding operation 8, and the sliding operation 9 may be the third sliding operation in this application.

It should be noted that the third operation may alternatively be another operation used to trigger the electronic device to execute the event of displaying the multi-task interface in the corresponding display area. The third operation is different from the first operation in S403 and the second operation in S405. This embodiment constitutes no specific limitation herein. In addition, there may be one or more fingers for performing the third operation. This embodiment also constitutes no specific limitation herein.

S408. In response to the third operation, the electronic device displays the multi-task interface in the first display area.

After the electronic device receives the third operation performed by the user in the first display area, in response to the third operation, the electronic device may execute a corresponding event for the first display area, for example, display the multi-task interface in the first display area. The multi-task interface may include an identifier of an application that runs in background or an application that recently runs in the electronic device. The identifier may be a screenshot of an interface last displayed before the corresponding application exits running in a foreground, an icon of the application, or the like. When the user triggers the identifier (for example, taps the icon), the application corresponding to the icon may be switched to the foreground for display.

Figures 10A, 10B:
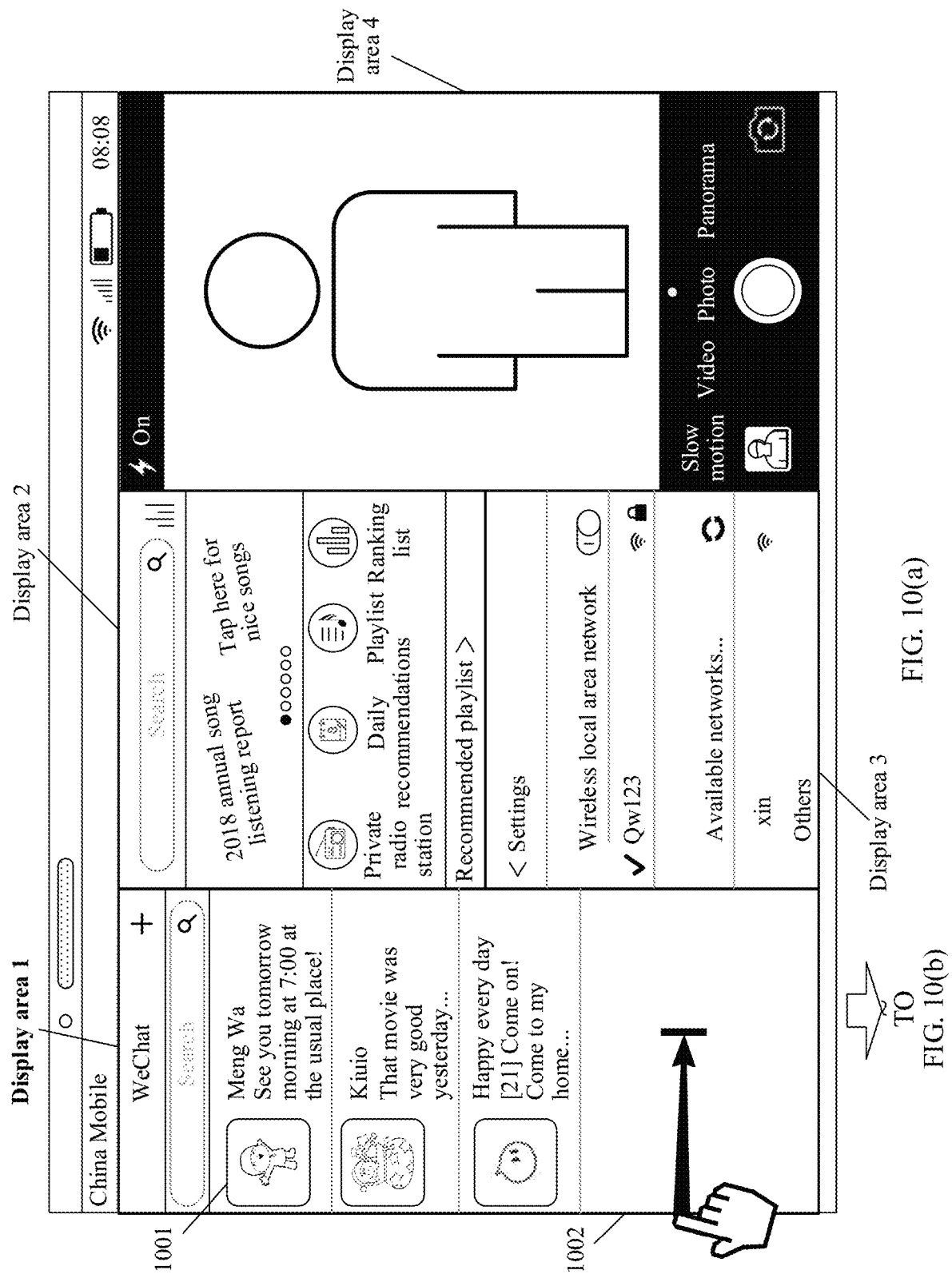
FIG. 10(a) and FIG. 10(b) each are still another schematic diagram of an interface during split-screen display according to an embodiment of this application.
Figures 10A, 10B:
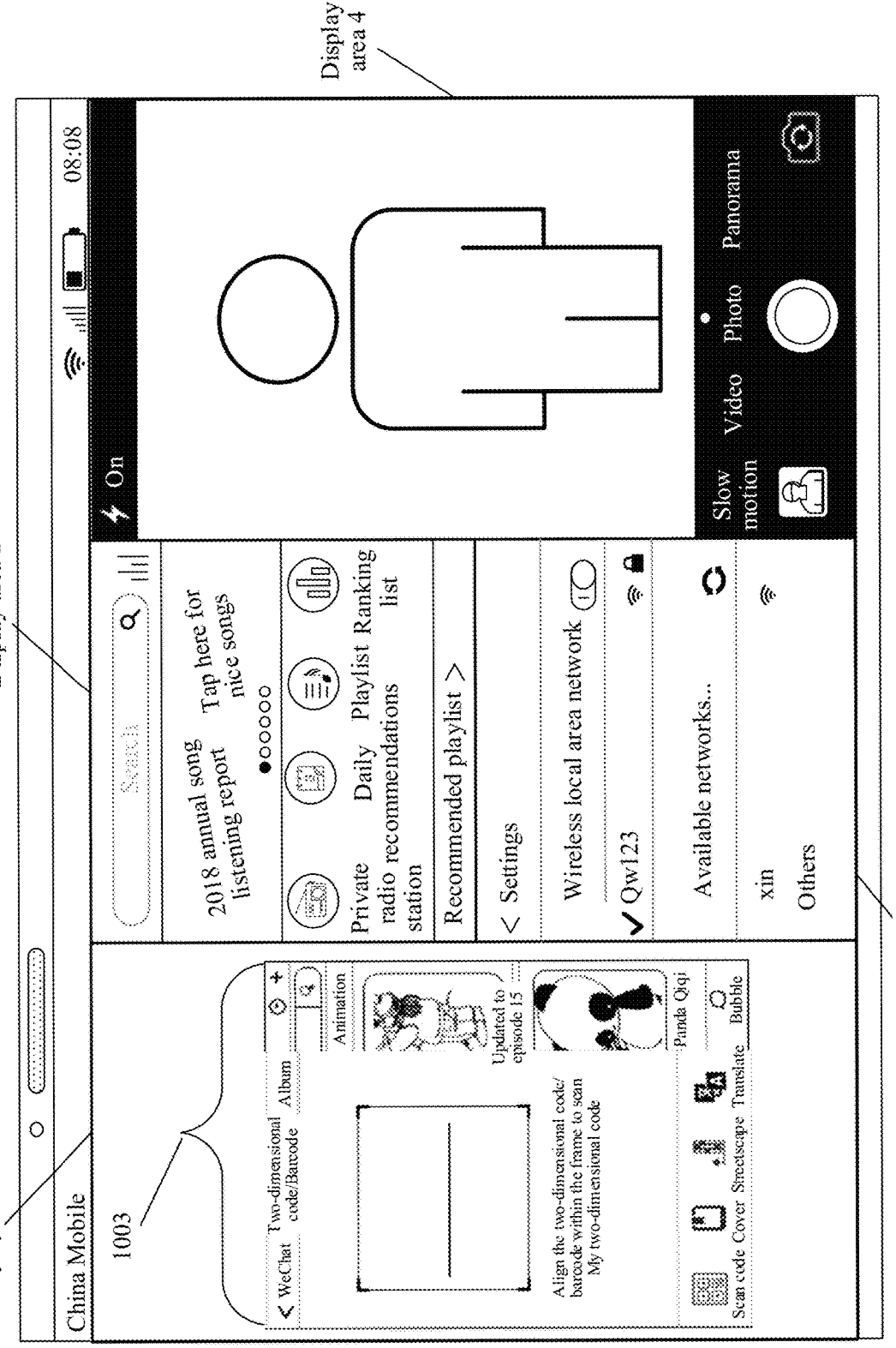

For example, with reference to FIG. 6, the first display area is the display area 1, there is one finger for performing the third operation, the third operation is the sliding operation 7, and the third preset duration is 200 ms. As shown in FIG. 10(*a*), an interface 1001 of WeChat is currently displayed in the display area 1 on the touchscreen of the electronic device. When the user wants to display an interface of another application in the display area 1 to implement split-screen display with the applications displayed in the display area 2, the display area 3, and the display area 4, as shown in FIG. 10(*a*), the user may perform the third operation in the display area 1. That is, the user may perform a sliding operation from an edge 1002 of the display area 1 that is closely adjacent to the edge of the touchscreen with a single finger in a direction away from the edge 1002, and sliding duration exceeds 200 ms (or the user performs a sliding operation from an edge 1002 of the display area 1 that is closely adjacent to the edge of the touchscreen with a single finger in a direction away from the edge 1002, sliding duration exceeds 200 ms, and the finger is not lifted immediately after sliding, but instead there is a pause of predetermined duration before the finger is lifted). In response to the third operation, as shown in FIG. 10(*b*), the electronic device may display a multi-task interface 1003 in the display area 1. The multi-task interface includes a screenshot of an interface last displayed before an application that runs in the background exits running in the foreground, for example, as shown in FIG. 10(*b*), a screenshot of an interface displayed before Alipay exits running in the foreground, and a screenshot of an interface displayed before a video application exits running in the foreground. That is, when the electronic device detects that the finger of the user slides in from the edge of the display area 1 that is closely adjacent to the edge of the touchscreen and the sliding duration is greater than 200 ms, in response, the electronic device may execute the event of displaying the multi-task interface in the display area 1. In this way, the user can select another application in the display area 1 (for example, perform a tap operation on the screenshot on the multi-task interface 1003), to implement split-screen display with the applications displayed in the display area 2, the display area 3, and the display area 4. In addition, in some embodiments, a time point at which the electronic device executes the event of displaying the multi-task interface in the display area 1 may be a moment at which the sliding duration in which the finger of the user performs the sliding operation is equal to the third preset time, for example, a moment of 200 ms.

It should be noted that in this embodiment, the event executed by the electronic device in response to the third operation performed by the user is not limited to the event of displaying the multi-task interface. In some embodiments, when the user performs the third operation in the first display area, the event executed by the electronic device in response to the third operation may be the same as or certainly may be different from an event executed by the electronic device after the user performs a tap operation on a recent (recent) button in a navigation bar when no split-screen display is implemented.

According to the operation method for split-screen display provided in this embodiment of this application, during split-screen display, the user does not need to perform a series of operations for interfaces of different applications displayed in a plurality of display areas, but needs to perform only one operation in a corresponding display area. In this way, the electronic device can execute events such as going back or exiting an application displayed in the display area. This reduces complexity of a user operation, improves use efficiency of the electronic device, and implements efficient interaction between the electronic device and the user.

Some other embodiments of this application further provide a computer storage medium. The computer storage medium may include computer instructions. When the computer instructions are run on an electronic device, the electronic device is enabled to perform the operations performed by the electronic device in the corresponding embodiment in FIG. 4.

Some other embodiments of this application further provide a computer program product. When the computer program product runs on a computer, the computer is enabled to perform the operations performed by the electronic device in the corresponding embodiment in FIG. 4.

Some other embodiments of this application further provide an apparatus. The apparatus has a function of implementing the actions of the electronic device in the corresponding embodiment in FIG. 4. The function may be implemented by hardware, or may be implemented by executing corresponding software by hardware. The hardware or software includes one or more modules corresponding to the function, for example, a determining unit or module, a storage unit or module, a division unit or module, and a display unit or module.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An operation method for split-screen display, wherein the method comprises:
    receiving, by an electronic device, a first sliding operation, wherein the electronic device comprises a touchscreen divided into a first display area and a second display area, the first display area displaying a first interface of a first application, and the second display area displaying a third interface of a second application, wherein the first application and the second application do not interact with each other, wherein the first sliding operation is received in the first display area, wherein a start point of the first sliding operation is a first edge of the first display area, a sliding direction of the first sliding operation is away from the first edge, and the first edge of the first display area is an edge of the first display area that is adjacent to an edge of the touchscreen;
    in response to the first sliding operation, performing, by the electronic device, at least one of following operations:
    when determining that the first interface is not a home page of the first application, displaying a second interface of the first application in the first display area, wherein the second interface is a previous-level interface of the first interface; or
    when determining that the first interface is the home page of the first application,
    enabling, the first application displayed in the first display area to exit the split-screen display, and adjusting a size of the second display area.

2. The method according to claim 1, wherein a duration of the first sliding operation is less than or equal to a first preset duration; or the sliding direction is a first preset direction.

3. The method according to claim 1, wherein after displaying the previous-level interface of the first interface in the first display area, the method further comprises:
    receiving, by the electronic device, a second sliding operation performed by a user in the second display area;
    in response to the second sliding operation, enabling, by the electronic device, the second application displayed in the second display area to exit the split-screen display.

4. The method according to claim 3, wherein both a start point and an end point of the second sliding operation are a second edge of the second display area, wherein sliding directions of the second operations includes a first sliding direction that is first away from the second edge, and a second sliding direction that is toward the second edge, and wherein a sliding duration of the first sliding direction is less than or equal to a second preset duration; or
    wherein both a start point and an end point of the second sliding operation are the second edge of the second display area, wherein sliding directions of the second sliding operations includes a first sliding direction that is first away from the second edge, and a second sliding direction that is toward the second edge, and wherein a sliding distance in in the first sliding direction is less than or equal to a second preset distance; or
    wherein a start point of the second sliding operation is the second edge of the second display area, wherein a sliding direction of the second sliding operation is away from the second edge, and the sliding direction is a second preset direction, and wherein the second edge of the second display area is an edge of the second display area that is adjacent to an edge of the touchscreen.

5. The method according to claim 1, wherein after displaying the previous-level interface of the first interface in the first display area, the method further comprises:
    receiving, by the electronic device, a third sliding operation performed by a user in the second display area;
    in response to the third sliding operation, displaying, by the electronic device, a multi-task interface in the second display area, wherein the multi-task interface comprises an identifier of an application that runs in a background or ran in the electronic device during a past predetermined time.

6. The method according to claim 5, wherein the identifier of the application is a screenshot of an interface last displayed before the application exits running in a foreground, or an icon of the application.

7. The method according to claim 5, wherein a start point of the third sliding operation is the second edge of the second display area, a sliding direction of the third operation is away from the second edge, and a duration is of the third operation greater than a third preset duration; or
    wherein a start point of the third sliding operation is the second edge of the second display area, a sliding direction of the third operation is away from the second edge, a duration of the third operation is greater than a third preset duration, and there is a pause of a predetermined duration after sliding; or wherein a start point of the third sliding operation is the second edge of the second display area, a sliding direction of the third operation is away from the second edge, and a sliding distance of the third operation is greater than a third preset distance; or wherein a start point of the third sliding operation is the second edge of the second display area, a sliding direction of the third operation is away from the second edge, and the sliding direction of the third operation is a third preset direction.

8. The method according to claim 1, wherein the method further comprises:
receiving, by the electronic device, a dragging operation performed on an application isolation bar between the first display area and the second display area;
in response to the dragging operation, adjusting, by the electronic device, sizes of interfaces of applications displayed in the first display area and the second display area.

9. The method according to claim 1, wherein the adjusting of the size of the second display area comprises:
enlarging the second display area.

10. The method according to claim 1, wherein the adjusting of the size of the second display area comprises:
displaying the third interface of the second application on the touchscreen in a full screen.

11. An electronic device, comprising:
a processor;
a memory; and
a touchscreen;
wherein the touchscreen is divided into a first display area and a second display area, the first display area displaying a first interface of a first application, the second display area displaying a third interface of a second application, wherein the first application and the second application do not interact with each other;
wherein the memory and the touchscreen are coupled to the processor, wherein the memory is configured to store computer instructions, which, when executed by the processor of the electronic device, cause the electronic device to perform operations comprising:
receiving a first sliding operation in the first display area, wherein a start point of the first sliding operation is a first edge of the first display area, a sliding direction of the first sliding operation is away from the first edge, and the first edge of the first display area is an edge of the first display area that is adjacent to an edge of the touchscreen;
in response to the first sliding operation, performing at least one of following operations:
when determining that the first interface is not a home page of the first application, displaying a second interface of the first application in the first display area, wherein the second interface is a previous-level interface of the first interface; or
when determining that the first interface is the home page of the first application, enabling the first application displayed in the first display area to exit split-screen display, and adjusting a size of the second display area.

12. The electronic device according to claim 11, wherein a duration of the first sliding operation is less than or equal to a first preset duration; or the sliding direction is a first preset direction.

13. The electronic device according to claim 11, wherein after displaying the previous-level interface of the first interface in the first display area, the electronic device is enabled to further perform:
receiving a second sliding operation performed by a user in the second display area;
in response to the second sliding operation, enabling the second application displayed in the second display area to exit the split-screen display.

14. The electronic device according to claim 13, wherein both a start point and an end point of the second sliding operation are a second edge of the second display area, wherein sliding directions of the second operations includes a first sliding direction that is first away from the second edge, and a second sliding direction that is toward the second edge, and wherein a sliding duration of the first sliding direction is less than or equal to a second preset duration; or
wherein both a start point and an end point of the second sliding operation are the second edge of the second display area, wherein sliding directions of the second sliding operations includes a first sliding direction that is first away from the second edge, and a second sliding direction that is toward the second edge, and wherein a sliding distance in in the first sliding direction is less than or equal to a second preset distance; or
wherein a start point of the second sliding operation is the second edge of the second display area, wherein a sliding direction of the second sliding operation is away from the second edge, and the sliding direction is a second preset direction, and wherein the second edge of the second display area is an edge of the second display area that is adjacent to an edge of the touchscreen.

15. The electronic device according to claim 11, wherein after displaying the previous-level interface of the first interface in the first display area, the electronic device is enabled to further perform:
receiving a third sliding operation performed by a user in the second display area;
in response to the third sliding operation, displaying a multi-task interface in the second display area, wherein the multi-task interface comprises an identifier of an application that runs in a background or ran in the electronic device during a past predetermined time.

16. The electronic device according to claim 15, wherein the identifier of the application is a screenshot of an interface last displayed before the application exits running in a foreground, or an icon of the application.

17. The electronic device according to claim 11, wherein the electronic device is enabled to further perform:
receiving a dragging operation performed on an application isolation bar between the first display area and the second display area;
in response to the dragging operation, adjusting sizes of interfaces of applications displayed in the first display area and the second display area.

18. The electronic device according to claim 11, wherein the adjusting of the size of the second display area comprises: enlarging the second display area.

19. The electronic device according to claim 1, wherein the adjusting of the size of the second display area comprises: displaying the third interface of the second application on the touchscreen in full screen.

20. A non-transitory computer readable medium that stores computer instructions, which when executed by a processor of an electronic device, cause the electronic device to perform operations comprising:

receiving a first sliding operation in a first display area of a touchscreen of the electronic device, wherein the touchscreen is divided into the first display area and a second display area, the first display area displaying a first interface of a first application, the second display area displaying a third interface of a second application, wherein the first application and the second application do not interact with each other, wherein a start point of the first sliding operation is a first edge of the first display area, a sliding direction of the first sliding operation is away from the first edge, and the first edge of the first display area is an edge of the first display area that is adjacent to an edge of the touchscreen;

in response to the first sliding operation, performing at least one of following operations:

when determining that the first interface is not a home page of the first application, displaying a second interface of the first application in the first display area, wherein the second interface is a previous-level interface of the first interface; or when determining that the first interface is the home page of the first application, enabling the first application displayed in the first display area to exit split-screen display, and adjusting a size of the second display area.

* * * * *